United States Patent
An et al.

(10) Patent No.: US 12,192,859 B2
(45) Date of Patent: Jan. 7, 2025

(54) SYSTEM AND METHOD FOR IMPLEMENTING RELAY NODES IN A WIRELESS NETWORK

(71) Applicant: Alibaba (China) Co., Ltd., Hangzhou (CN)

(72) Inventors: Qing An, Beijing (CN); Wenbing Chen, Hangzhou (CN)

(73) Assignee: ALIBABA (CHINA) CO., LTD., Hangzhou (CN)

( * ) Notice: Subject to any disclaimer, the term of this patent is extended or adjusted under 35 U.S.C. 154(b) by 374 days.

(21) Appl. No.: 17/690,798

(22) Filed: Mar. 9, 2022

(65) Prior Publication Data

US 2022/0295240 A1    Sep. 15, 2022

(30) Foreign Application Priority Data

Mar. 12, 2021    (CN) .......................... 202110272327.4

(51) Int. Cl.
*H04W 4/12*    (2009.01)
*H04W 4/80*    (2018.01)
*H04W 88/04*    (2009.01)

(52) U.S. Cl.
CPC .............. *H04W 4/12* (2013.01); *H04W 4/80* (2018.02); *H04W 88/04* (2013.01)

(58) Field of Classification Search
CPC ......... H04W 4/12; H04W 4/80; H04W 88/04; H04W 24/02; H04W 8/005; H04W 84/18; H04W 4/06; H04W 40/22
USPC ........................................................ 370/329
See application file for complete search history.

(56) References Cited

U.S. PATENT DOCUMENTS

| | | | |
|---|---|---|---|
| 6,550,062 | B2 | 4/2003 | Barajas |
| 8,577,810 | B1 | 11/2013 | Dalit |
| 9,881,295 | B1 | 1/2018 | Buddhavarapu |
| 10,083,358 | B1 | 9/2018 | Shin |
| 10,924,476 | B2 | 2/2021 | Hecker |
| 2010/0015946 | A1 | 1/2010 | Zhang |
| 2012/0116887 | A1 | 5/2012 | Norair |
| 2013/0015946 | A1 | 1/2013 | Lau |
| 2013/0103511 | A1 | 4/2013 | Fisher |
| 2014/0063256 | A1 | 3/2014 | Mongeon |

(Continued)

FOREIGN PATENT DOCUMENTS

| | | |
|---|---|---|
| CN | 204557684 | 8/2015 |
| CN | 106411856 | 2/2017 |

(Continued)

*Primary Examiner* — Mang Hang Yeung
(74) *Attorney, Agent, or Firm* — Shun Yao; Yao Legal Services, Inc.

(57) ABSTRACT

One embodiment described herein provides a system and method for adjusting the relay state of nodes in a wireless network. During operation, the system can obtain relay-state information associated with a plurality of neighboring nodes of a respective node in the wireless network. The system can identify, among the plurality of neighboring nodes, a set of relay neighbors capable of relaying messages based on the obtained relay-state information and determine a connectivity status of the set of relay neighbors. The system can then determine an expected relay state of the respective node based on a count and the connectivity status of the set of relay neighbors and can adjust a relay state of the respective node based on the expected relay state.

18 Claims, 13 Drawing Sheets

(56) References Cited

U.S. PATENT DOCUMENTS

| | | |
|---|---|---|
| 2014/0331189 A1 | 11/2014 | Lee |
| 2015/0081550 A1 | 3/2015 | Priebatsch |
| 2016/0163029 A1 | 6/2016 | Gibbon |
| 2018/0053190 A1 | 2/2018 | Gurunathan |
| 2018/0165728 A1 | 6/2018 | McDonald |
| 2018/0336687 A1 | 11/2018 | Mudretsov |
| 2018/0374099 A1 | 12/2018 | Litsur |

FOREIGN PATENT DOCUMENTS

| | | | | |
|---|---|---|---|---|
| CN | 112055343 A | * | 12/2020 | ............ H04L 45/32 |
| WO | 20150183394 | | 12/2015 | |
| WO | 20170148258 | | 9/2017 | |

* cited by examiner

SYSTEM AND METHOD FOR IMPLEMENTING RELAY NODES IN A WIRELESS NETWORK

RELATED APPLICATION

Under 35 U.S.C. § 119, this application claims the benefit and right of priority of Chinese Patent Application No. 202110272327.4, filed 12 Mar. 2021.

BACKGROUND

Field

This disclosure is generally related to wireless communication technologies. More specifically, this disclosure is related to a wireless communication network that includes a number of relay nodes.

Related Art

To extend the communication range of Bluetooth devices, Bluetooth Special Interest Group (SIG) has developed the Bluetooth Mesh protocol, which is a computer mesh networking standard built upon the existing Bluetooth Low Energy (BLE) standard that allows for many-to-many communication over Bluetooth radios. Bluetooth Mesh enables the creation of large-scale device networks by implementing mesh topologies and supporting multi-hop connections, thus expanding the coverage area of a Bluetooth network. It is ideally suited for control, monitoring, and automation systems where hundreds, or thousands of devices need to communicate with one another, such as in smart homes or smart buildings that implement Internet of Things (IoT) technologies.

Bluetooth Mesh standard operates on a flood network principle where nodes in the network communicate with each other by sending messages. More specifically, each node in the network broadcasts to other nodes in the network messages (referred to as broadcast messages); after receiving a broadcast message, other nodes in the network may relay (or re-broadcast) the broadcast message until the destination node receives the broadcast message. In current Bluetooth Mesh networks, many invalid or unnecessary messages may be transmitted in the network, which may negatively affect the throughput of the network.

SUMMARY

One embodiment described herein provides a system and method for adjusting the relay state of nodes in a wireless network. During operation, the system can obtain relay-state information associated with a plurality of neighboring nodes of a respective node in the wireless network. The system can identify, among the plurality of neighboring nodes, a set of relay neighbors capable of relaying messages based on the obtained relay-state information and determine a connectivity status of the set of relay neighbors. The system can then determine an expected relay state of the respective node based on a count and the connectivity status of the set of relay neighbors and can adjust a relay state of the respective node based on the expected relay state.

In a variation on this embodiment, obtaining the relay-state information can include receiving a relay-state message from a respective neighboring node, and the relay-state message can include address information, a relay-state indicator, and neighbor information associated with the respective neighboring node.

In a further variation, in response to determining that the respective neighboring node is a relay neighbor based on the relay-state information, the system can store an entry corresponding to the respective neighboring node in a neighbor list maintained by the respective node. The system can further update the entry in response to receiving a subsequent relay-state message from the respective neighboring node.

In a further variation, the entry can include a timestamp associated with the relay-state message. In response to determining, based on the timestamp, that an entry in the neighbor list expires, the system can delete the expired entry. In response to determining, based on the timestamp, that an entry in the neighbor list needs to be updated, the system can send a state-request message to a corresponding neighboring node.

In a further variation, updating the entry can include deleting the entry from the neighbor list in response to determining, based on the relay-state indicator included in the subsequent relay-state message, that the relay state of the respective neighboring node is "off."

In a variation on this embodiment, determining the expected relay state can include determining that the expected relay state is "on," in response to determining that the count of the set of relay neighbors equals or exceeds a predetermined neighbor threshold and that the set of relay neighbors are all relay neighbors of each other.

In a further variation, in response to detecting frequent flooding events in the wireless network, the system can decrement the neighbor threshold.

In a variation on this embodiment, the system can periodically send relay-state messages and adjust a period for sending the relay-state messages based on a number of previously sent relay-state messages.

In a variation on this embodiment, determining the expected relay state can include periodically executing a relay-decision operation, and a period for executing the relay-decision operation can be adjusted based on a number of previously executed relay-decision operations.

In a variation on this embodiment, adjusting the relay state can include sending a relay-configuration message from a centralized controller to the respective node to instruct the respective node to adjust the relay state.

BRIEF DESCRIPTION OF THE FIGURES

In the figures, like reference numerals refer to the same figure elements.

DETAILED DESCRIPTION

Figure 1:
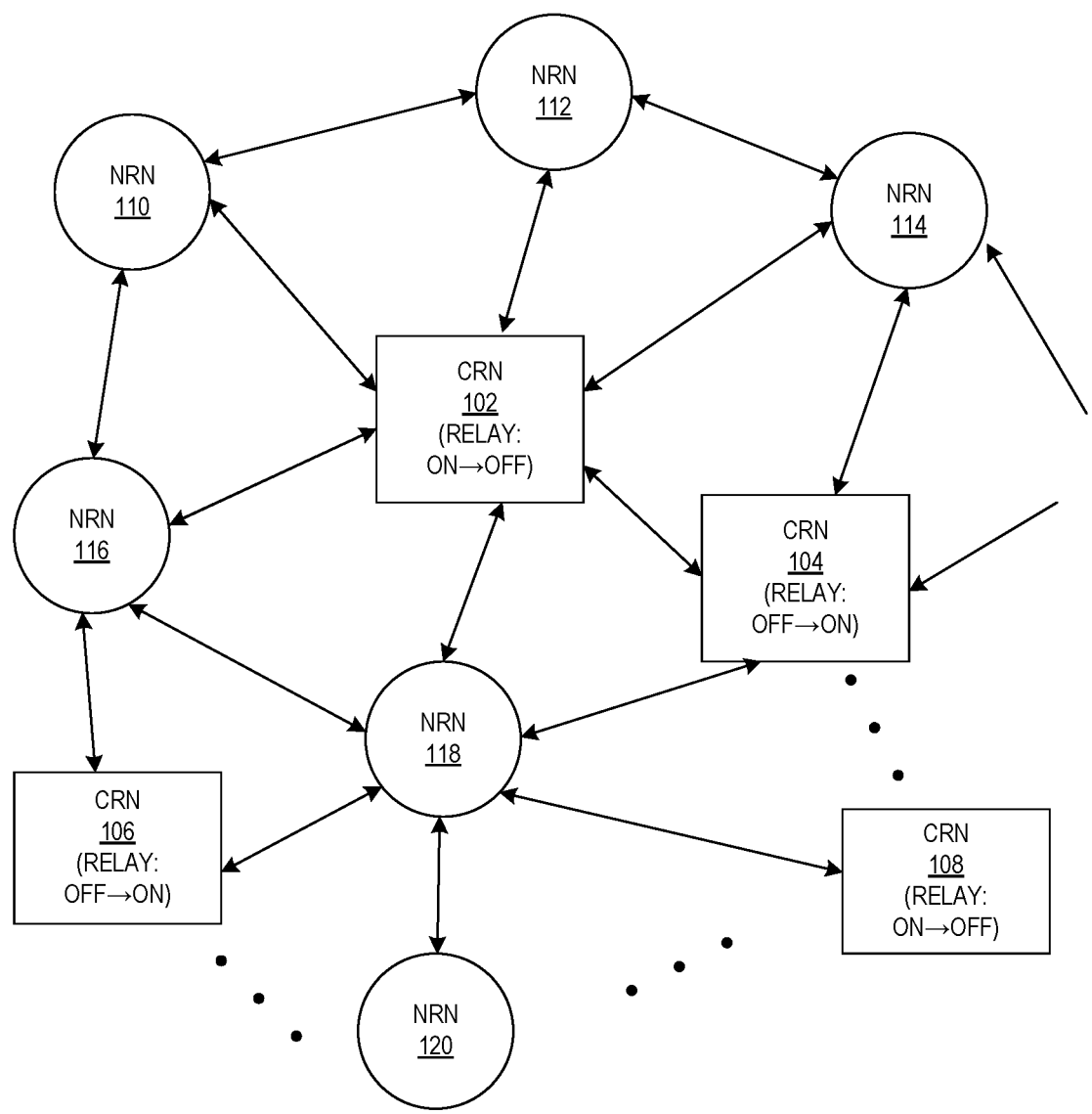
FIG. 1 illustrates an exemplary network with controllable relay nodes, according to one embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a Bluetooth network that implements controllable or configurable relay nodes, where the relay state of the nodes can be controlled or configured automatically, either in a distributed manner or in a centralized manner. When a controllable or configurable relay node is in a relay-on state, it can re-transmit received broadcast messages, thus extending the Bluetooth communication range. Moreover, each controllable or configurable relay node can adjust its relay state (e.g., turning on or off its relay function) based on the connectivity status and the relay states of its neighboring controllable or configurable relay nodes. This way, the number of nodes in the network performing the relay operation can be controlled dynamically according to the real-time topology of the Bluetooth network, such that there are neither too many nor too few of them. This approach not only can reduce the amount of invalid or unnecessary retransmission of broadcast messages (thus increasing throughput) but also can ensure the connectivity of the Bluetooth network.

Bluetooth Mesh Network

To increase its efficiency, a Bluetooth Mesh network may implement a direct forwarding mechanism by provisioning a subset of nodes as relay nodes with relay functionalities. Each relay node can maintain, through path-discovery, a source address-destination address mapping table. Each time a relay node receives a broadcast packet or message, it checks the mapping table; if the source address-destination address combo matches an entry in the mapping table, the relay node relays the broadcast packet; otherwise, the relay node discards the broadcast packet.

The above approach has two main shortcomings. First, the cost for discovering the relay path between the source node and the destination node is high, because it requires broadcasting path-discovery packets to the entire network to discover relay nodes on the path and to record, at each relay node on the path, the corresponding source address-destination address pair. A large number of path-discovery packets needs to be broadcast to the network in order to discover the relay path between any pair of nodes in the network, thus resulting in a high bandwidth cost. Second, the above approach cannot timely detect changes in the network topology. For example, a node on the relay path may be powered down or may change its location, and such a change may not be detected and may result in packet-forwarding failures.

To provide efficient packet forwarding without these shortcomings, in some embodiments of the instant application, the relay function of one or more nodes in a wireless mesh network can be dynamically activated or deactivated based on the current network topology as well as the relay state of their neighboring nodes.

FIG. 1 illustrates an exemplary network with controllable relay nodes, according to one embodiment. A wireless network 100 can include a plurality of nodes, including controllable or configurable relay nodes (CRNs) (e.g., CRNs 102, 104, 106, and 108) and nodes without relay functions (also known as non-relay nodes or NRNs) (e.g. NRNs 110-120). In some embodiments, wireless network 100 is a Bluetooth Mesh network with each node being a Bluetooth-enabled device capable of communicating with other nodes in network 100 according to the Bluetooth standard. Examples of Bluetooth-enabled devices can include but are not limited to: Bluetooth mobile phones, Bluetooth earphones, Bluetooth speakers, Bluetooth switches, Bluetooth televisions, Bluetooth lights, Bluetooth bracelets, etc. A number of versions of the Bluetooth standard have been developed, including Bluetooth 1.0, Bluetooth 2.0, Bluetooth 3.0, and Bluetooth 4.0. Various nodes in network 100 may support the same or different versions of the Bluetooth standard. The scope of this disclosure is not limited by the type or version of the communication standard implemented at each node.

In the examples shown in FIG. 1, the various nodes in network 100 are coupled to each other wirelessly, forming a mesh topology. However, the scope of this disclosure is not limited by the topology of the network. These coupled nodes may also form different topologies, including but not limited to: a star topology, a tree topology, a ring topology, a mesh topology, etc.

An NRN refers to a node without packet-retransmission capabilities. Network 100 can include at least one NRN that is communicatively coupled to one or more CRNs (e.g., via Bluetooth communication links). An NRN can operate in a broadcast mode, meaning that it can receive and transmit, within its signal coverage range, Bluetooth broadcast messages. Current versions of Bluetooth standards all support the broadcast mode, meaning that a Bluetooth device supporting any version of the Bluetooth standard can be used as an NRN. Therefore, although a hardware-limited Bluetooth device may not support higher versions of the Bluetooth standard, it can still be part of network 100, and it can extend its communication range with the assistance of the relay function of the CRNs. It is also possible for a hardware-advanced Bluetooth device to serve as an NRN.

On the other hand, a CRN refers to a node capable of retransmitting messages received from NRNs or other CRNs, and the relay function of the CRN can be controlled (i.e., activated or deactivated). Network 100 can include at least two CRNs that are communicatively coupled to each other. The communicative coupling between any pair of CRNs can be direct or indirect. In some embodiments, CRNs can be coupled to each other via Bluetooth communication links. The Bluetooth standard supported by a CRN needs to support the network interconnect and relay functions, such as Bluetooth 4.0 or a higher version. A typical CRN can be a Bluetooth device with better computing capabilities, such as Bluetooth mobile phones, Bluetooth televisions, Bluetooth speakers, etc.

In addition to relaying received broadcast messages, a CRN can also communicate with other CRNs or NRNs. If the other communication party (either a CRN or an NRN) is within the coverage range of the Bluetooth signals of a particular CRN, the particular CRN can directly communicate with the other communication party; otherwise, the particular CRN can indirectly communicate with the other communication party with the assistance of the relay function of surrounding CRNs. Similarly, an NRN can communicate with other NRNs or CRNs. If the other communication party (either an NRN or a CRN) is within the coverage range of the Bluetooth signals of a particular NRN, the particular NRN can directly communicate with the other communication party; otherwise, the particular NRN can indirectly communicate with the other communication party with the assistance of the relay function of surrounding CRNs.

For example, with respect to NRN 112, CRN 102 is inside its signal coverage area, whereas CRN 108 and NRN 120 are both outside of its signal coverage area. In order to communicate with CRN 108 or NRN 120, CRN 102 needs the assistance of the relay function of CRN 102. More specifically, NRN 112 broadcasts messages to network 100, and CRN 102, which is within the signal coverage area of NRN 112, receives the broadcast message. CRN 102 determines that it is not the recipient of the broadcast message and then re-broadcasts the message to network 100. Messages broadcast by CRN 102 may be received and re-broadcast by other CRNs in network 100 until CRN 108 or NRN 120 receives such broadcast messages and determines that it is the recipient of the messages. Accordingly, CRN 108 or NRN 120 can then process the received messages.

In the example shown in FIG. 1, nodes (e.g., higher version Bluetooth devices) capable of relaying messages are configured as CRNs, whereas nodes operating in the broadcast mode can be configured as NRNs. With the assistance of the relay function of the CRNs, an NRN is able to communicate with other NRNs or CRNs outside of its signal coverage area, thus extending the Bluetooth communication range. Bluetooth devices configured as NRNs only need to support the Bluetooth broadcast functions. The hardware requirement for the NRNs is low and not limited by the hardware capability of the Bluetooth devices. In situations where there are multiple CRNs in the network (as shown in FIG. 1), different NRNs can be separately coupled to different CRNs, such that the communication load on each CRN is relatively low, thus lowering the power consumption of each CRN.

In some embodiments, a CRN can adjust its relay state, such as turning on or off its relay function, based on the relay state and the connectivity status of its neighboring CRNs. When the relay state of a CRN is "on," the CRN is considered active and is capable of relaying messages; when the relay state of a CRN is "off," the CRN is considered inactive and cannot relay messages. In other words, when a CRN is in a "relay-off" or inactive state, it functions similarly as an NRN and operates in the broadcast mode (i.e., it can receive and send messages but cannot relay messages). In the example shown in FIG. 1, CRNs 102 and 108 have adjusted their relay state from "on" to "off," and CRNs 104 and 106 have adjusted their relay state from "off" to "on." By allowing the CRNs to dynamically adjust their relay state, the number of active CRNs can be adjusted dynamically according to the real-time topology of the network. This way, at any given time, the number of active CRNs is neither too many nor too few, thus reducing the amount of invalid and unnecessary retransmission of Bluetooth messages, increasing the network throughput while maintaining the connectivity of the network. Note that the neighboring CRNs of a particular CRN can be its one-hop, two-hop, three-hop, or multi-hop neighbors. In one embodiment, neighboring CRNs of a particular CRN can be its one-hop neighbors. In the example shown in FIG. 1, CRNs 102 and 104 can be the neighbor of each other.

CRN Configuration

In some embodiments, each CRN can determine whether to turn "on" or "off" its relay function based on the relay states of its neighboring CRNs. To do so, each CRN needs to broadcast its relay state to the network. In some embodiments, each node in the network can broadcast relay-state messages to the network and can also receive relay-state messages from other nodes in the network. Information included in a relay-state message can include whether the node is relay-enabled, the number of its neighboring relay nodes, and the addresses of the neighboring relay nodes. Table I presents an exemplary format of a relay-state message.

TABLE I

| FIELD | LENGTH (BYTE) | MEANING |
| --- | --- | --- |
| RELAY-STATE INDICATOR | 1 | Relay state of the node<br>0x00 → off<br>0x01 → on<br>0x02-0xFF → not in use |
| NEIGHBORING-RELAY-NODES-ADDRESS LIST (NbRelayAddrList) | 0-5 | Address list of active neighboring CRNs Each address can be 2-bytes long, each node can store addresses of 10 nodes, this field can store 5 addresses; if the number of stored nodes is greater than 5, two relay-state messages are needed |

Each relay-state message can include at least two fields. The relay-state-indicator field indicates the relay state of the node sending the message, and the neighboring-relay-node-address-list (NbRelayAddrList) field includes the addresses of neighboring active CRNs. The relay-state-indicator field can be one-byte long, with 0x00 indicating the relay state being "off" (or the CRN being inactive) and 0x01 indicating the relay state being "on" (or the CRN being active). The length of the relay-neighbor-address-list field can be between zero and five bytes and can include up to five addresses. Note that each node may maintain a list of 10 active CRN neighbors. If the number of active CRN neighbors of a node is greater than 5, addresses of those active CRN neighbors may be included in two separate relay-state messages.

In some embodiments, each node in the network can periodically broadcast relay-state messages to the network. The period for broadcasting the relay-state messages can be determined based on practical needs. In one embodiment, the default period can be 60 seconds. Alternatively, a node can broadcast its relay-state message to the network in response to a predetermined trigger condition being met. The predetermined trigger condition can include but is not limited to: the node being powered on, the node joining the network, the configuration of the node being updated, a change in the topology of the network being detected, etc. In further embodiments, a random delay (e.g., between 0 and 60 seconds) can be added the first time a node broadcasts the relay-state message to prevent the situation where two nodes simultaneously receive relay-state messages and both decide to turn off their relay function. In some embodiments, the time to live (TTL) value of the relay-state message can be set as 0, such that the relay-state message can only be received by the one-hop or immediate neighbors of the sending node. Alternatively, the TTL of the relay-state message can be set as 1 or 2 to allow the two- and/or three-hop neighbors to receive the message.

In addition to broadcasting its own relay-state messages, each node can also actively monitor the relay state of its neighbors. More specifically, a node can determine if it has received a relay-state message from its neighboring node within a predetermined time internal. The time interval can be determined based on practical needs. In one embodiment, the default setting can be 70 seconds. If no relay-state message from its neighboring node is received within the interval, the node can send a state-request message to its neighboring node. In some embodiments, the state-request message can be a unicast message with the destination address being the address of the neighboring node. Upon receiving the state-request message, the neighboring node can respond with a relay-state message to report its relay state. In some embodiments, a node can be configured to scan its relay neighbors by periodically broadcasting state-request messages to the network. In alternative embodiments, when a predetermined trigger condition is met, a node can start to scan its relay neighbors by broadcasting the state-request message to the network. The predetermined trigger condition can include but is not limited to: the node being powered on, the node joining the network, the configuration of the node being updated, a change in the topology of the network being detected, etc.

Figure 2:
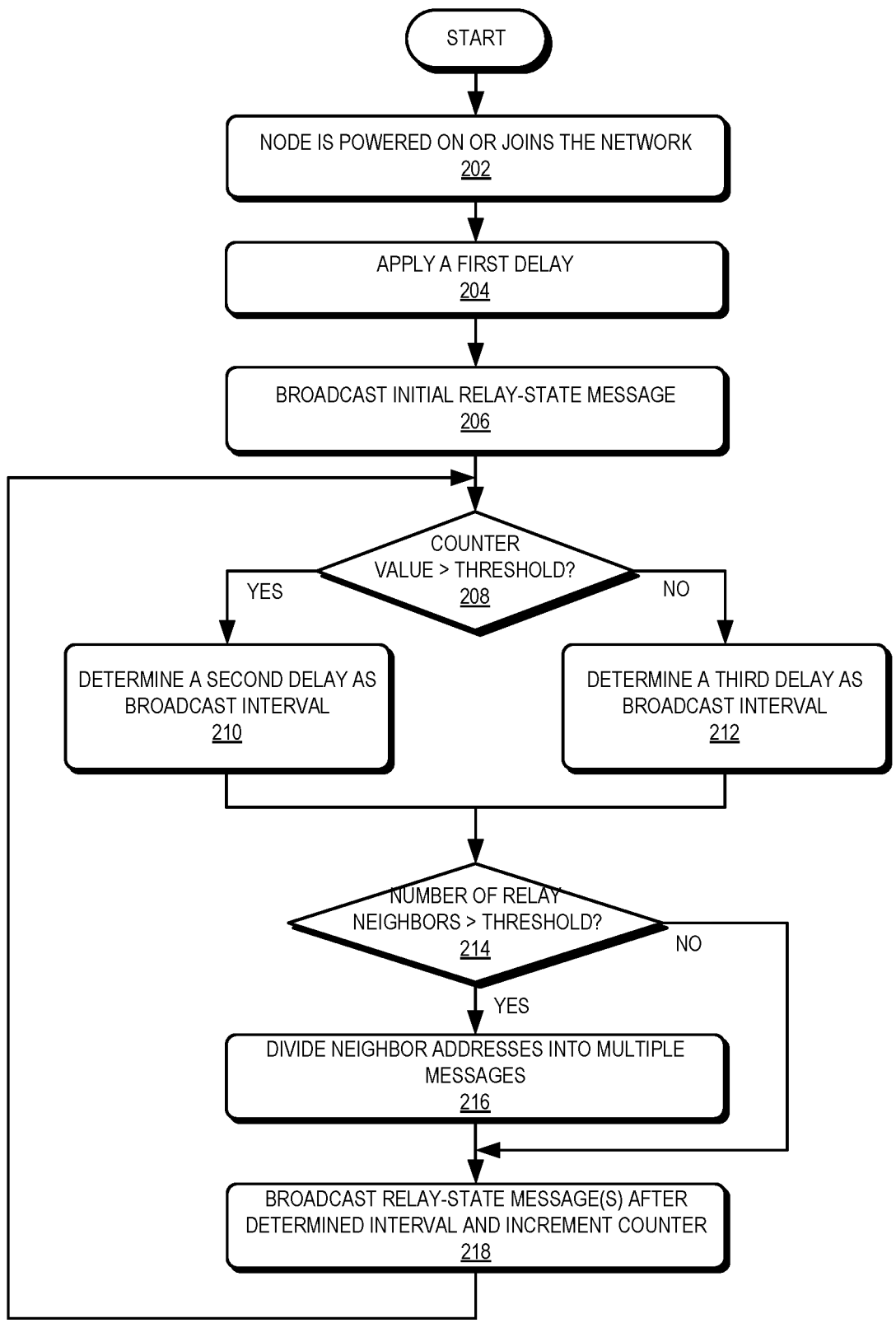
FIG. 2 presents a flowchart illustrating an exemplary process for broadcasting a relay-state message, according to one embodiment.

FIG. 2 presents a flowchart illustrating an exemplary process for broadcasting a relay-state message, according to one embodiment. During operation, a node is powered on or joins the network (operation 202). A first delay is applied (operation 204) before the node broadcasts an initial relay-state message to the network (operation 206). The first delay can include a predetermined first relay-state-broadcast period and a random time delay. In one embodiment, the default first relay-state-broadcast period can be 60 seconds, and the random time delay can be between 0 and 60 seconds. Applying the first delay before sending the initial relay-state message can ensure the stability of the network, because a newly powered or connected node should receive relay-state messages from its neighbors first, before sending out its own relay-state messages. This way, if a newly powered or connected CRN determines that there are sufficient active and connected CRNs in the network, the newly powered or connected CRN can first turn off its relay function before broadcasting its relay-state messages, thus ensuring that the existing active CRNs remain in a prolonged stable state. The added random delay at the beginning of the broadcast can prevent the situation where multiple nodes are simultaneously powered on and are sending relay-state messages, which may cause congestion in the network and may possibly lead to instabilities.

The node then determines whether a relay-state-message-counter value exceeds a predetermined threshold (operation 208). The counter value indicates the number of relay-state messages that have been sent by the newly powered or joined node. In some embodiments, the threshold value can be between 5 and 10. In one embodiment, the threshold value can be 10. Other threshold values are also possible. If the counter value is greater than the threshold, the node can determine a second delay as the time interval for broadcasting additional relay-state messages (operation 210). In some embodiments, the second delay can be the first predetermined relay-state-broadcast period (e.g., 60 seconds). If the counter value is less than or equals the threshold, the node can determine a third delay as the time interval for broadcasting additional relay-state messages (operation 212). The third delay can be a second predetermined relay-state-broadcast period, which can be smaller than the first predetermined relay-state-broadcast period. In one embodiment, the second predetermined relay-state-broadcast period can be half of the first predetermined relay-state-broadcast period. For example, the default value of the second predetermined relay-state-broadcast period can be 30 seconds. Other values are also possible. For example, the second predetermined relay-state-broadcast period can be one-fourth, one-third, two-thirds, three-fourths, etc., of the first predetermined relay-state-broadcast period. This way, a newly powered or connected node may broadcast an initial set of relay-state messages at a faster rate, thus allowing its neighbors to learn its relay state faster, thereby facilitating the faster election of active CRNs and the maintaining of the network stability. After broadcasting the initial set of relay-state messages, the node can broadcast subsequent relay-state messages at a slower rate. In further embodiments, the rate of broadcasting relay-state messages may be decreased further after a second set of relay-state messages.

Subsequent to determining the broadcasting time interval, the node can determine whether the number of stored relay neighbors is greater than a threshold value (operation 214). In one embodiment, the threshold value can be five. As shown in Table I, each node can store up to a predetermined number (e.g., 10) of relay neighbors (which are active CRNs); however, due to the size limit of Bluetooth Mesh messages, each relay-state message can only list a smaller number (e.g., five) of addresses. Hence, if the number of relay neighbors is greater than the threshold, the node can divide the relay neighbor address information into multiple (e.g., two) relay-state messages in order to include address information of all of its relay neighbors (operation 216). Otherwise, there is no need to divide the relay neighbor address information. The node can subsequently broadcast the relay-state message(s) after the determined time interval (e.g., the second or third delay) and can increment the counter (operation 218). The process then returns to operation 208.

In the example shown in FIG. 2, the newly powered or newly joined node broadcasts relay-state messages after an initial delay. When a node adjusts its relay state (e.g., from "on" to "off" or from "off" to "on"), it needs to broadcast its current relay state to its neighbors immediately (i.e., without delay). In such a situation, the process starts from operation 206.

Each CRN in the network can maintain a relay-neighbor list that stores information of neighboring active CRNs. For example, each entry in the relay-neighbor list can correspond to a neighboring active CRN and can include relay information associated with the active CRN. Note that the relay information associated with an active CRN can include information that can uniquely identify the active CRN, including but not limited to: an Internet protocol (IP) address, a media-control-access (MAC) address, a node identifier, etc. Moreover, the relay information of the active CRN can also include its neighbor information (e.g., the identifiers of its relay neighbors). Note that the neighbor information of a CRN is included in the relay-state message sent (either through broadcasting or unicasting) by the CRN. To indicate the freshness of the neighbor information, each entry in the relay-neighbor list also includes the timestamp of the relay-state message comprising such neighbor information.

Table II presents an exemplary format of a locally stored neighbor list of a CRN.

TABLE II

| ADDRESS OF ACTIVE CRN | TIMESTAMP | NEIGHBOR INFORMATION |
| --- | --- | --- |
| NODE A0 ADDRESS | TIME_1 | (A1, A2, A3) |
| NODE A1 ADDRESS | TIME_2 | (A0, A2, A4) |
| NODE A2 ADDRESS | TIME_3 | (A0, A1, A4) |
| NODE A3 ADDRESS | TIME_4 | (A0, A5, A6) |

As shown in Table II, the locally stored neighbor list of a CRN includes four entries, with each entry corresponding to a relay neighbor, including nodes A0, A1, A2, and A3. Note that a relay neighbor refers to a CRN node in a "relay-on" or active state. Depending on the design, a relay neighbor can be a one-hop neighbor or a multi-hop neighbor. A one-hop neighbor refers to a node within the Bluetooth signal range. Also note that the number of entries in the neighbor list can be limited (e.g., limited by the memory size). In one embodiment, the neighbor list can have up to ten entries, and additional relay neighbors may not be included in the neighbor list. In some embodiments, newly discovered relay neighbors may replace older relay neighbors (e.g., based on the timestamps).

Each entry in the neighbor list can include the address (e.g., the IP or MAC address) of a relay neighbor, the timestamp of the last relay-state message received from the relay neighbor, and the neighbor information included in the last relay-state message. For example, the first entry of Table II includes the address of a node A0, a timestamp (Time_1) of the last relay-state message received from node A0, and relay neighbors (identified as nodes A1, A2, and A3) of node A0. Similarly, the second entry indicates that the relay neighbors of node A1 include nodes A0, A2, and A4; the third entry indicates that the relay neighbors of node A2 include nodes A0, A1, and A4; and the fourth entry indicates that the relay neighbors of node A3 include nodes A0, A5, and A6.

Because each node receives relay-state messages from its neighbor nodes continuously, the locally stored neighbor list is continuously updated based on the received relay-state messages. For example, each time the node receives a relay-state message from a neighbor node, it can check the locally stored neighbor list to determine whether the neighbor node has a corresponding entry. If a corresponding entry exists and the relay-state message indicates that the neighbor node has disabled its relay function, then the corresponding entry is deleted from the neighbor list. If the corresponding entry exists, and the relay-state message indicates that the neighbor node remains active, then the corresponding entry is updated based on the timestamp of the newly received relay-state message and neighbor information included in the newly received relay-state message. On the other hand, if a corresponding entry cannot be found in the neighbor list, and the relay-state message indicates that the neighbor node has enabled its relay function, then an entry corresponding to the neighbor node is added to the locally stored neighbor list. In some embodiments, if the neighbor list is full, an existing entry with the oldest timestamp may be deleted to allow the newly discovered relay neighbor to be added to the neighbor list.

Figure 3:
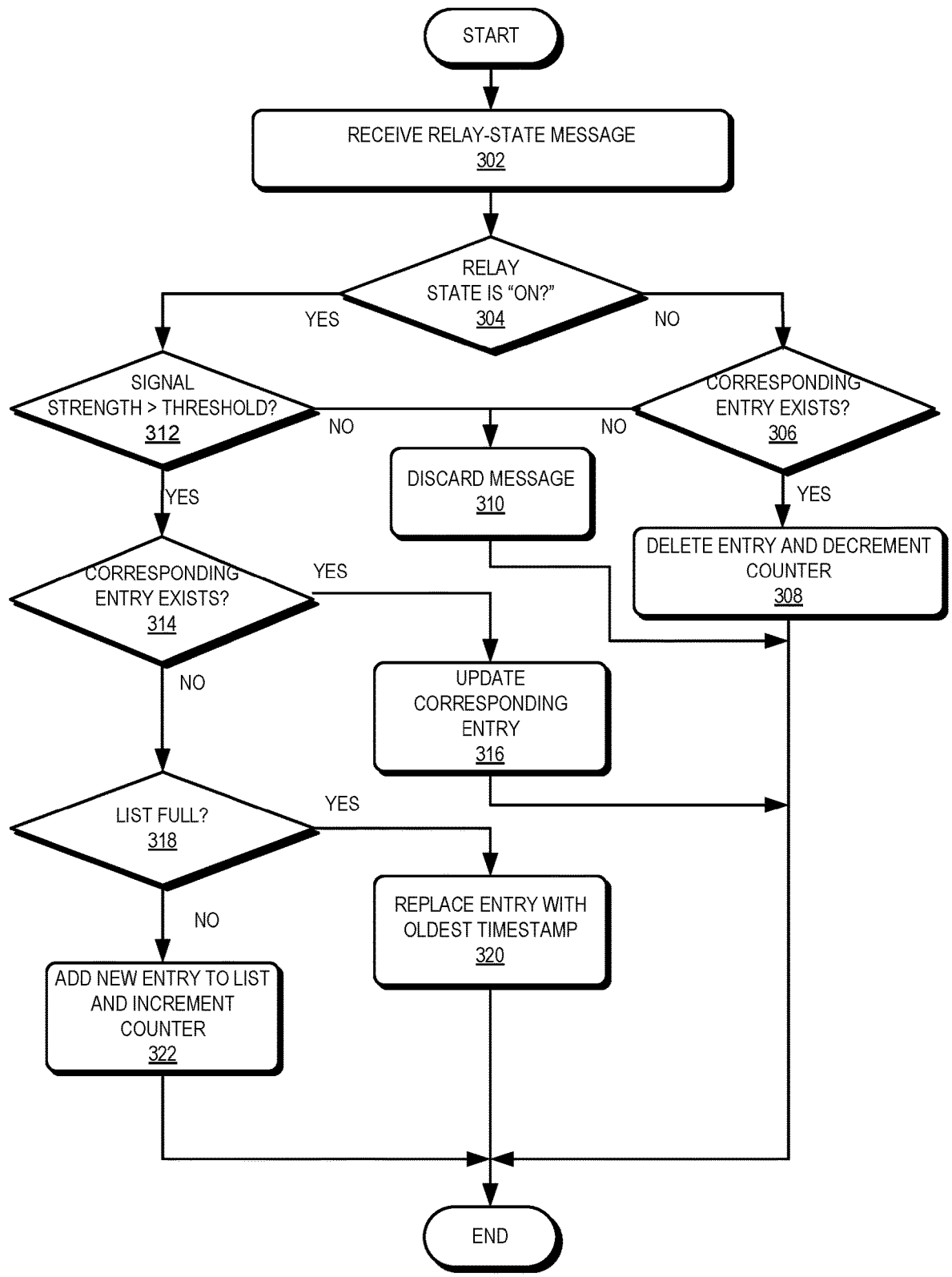
FIG. 3 presents a flowchart illustrating an exemplary process for receiving a relay-state message, according to one embodiment.

FIG. 3 presents a flowchart illustrating an exemplary process for receiving a relay-state message, according to one embodiment. During operation, a node receives a relay-state message from a neighbor node (operation 302) and determines whether the relay state of the neighbor node is "on" (operation 304). In some embodiments, the receiving node checks the relay-state-indicator field of the received relay-state message. If the relay-state-indicator field has a value of "0X00," the neighbor node is in a relay-off state or it is inactive; if the relay-state-indicator field has a value of "0X01," the neighbor node is in a relay-on state, or it is active.

If the neighbor node is not active, the receiving node determines whether there is an entry in its locally stored neighbor list corresponding to the neighbor node (operation 306). For example, the receiving node can compare the source address of the relay-state message with neighbor addresses listed in the locally stored neighbor list. If a corresponding entry is found, the receiving node deletes the corresponding entry from its locally stored neighbor list and decrements a counter that counts the number of entries in the list (operation 308), and the process ends. Note that this counter value corresponds to the number of relay neighbors of the receiving node and can be used in operation 214 shown in FIG. 2. If a corresponding entry is not found, the receiving node discards the relay-state message (operation 310), and the process ends.

If the neighbor node is active, the receiving node determines whether the signal strength of the neighbor node is greater than a predetermined threshold (operation 312). For example, the receiving node can compare the received signal strength indicator (RSSI) of the relay-state message with the predetermined threshold. If the signal strength is smaller than the threshold, the receiving node discards the relay-state message (operation 310), and the process ends. A node only considers neighbor nodes with good signals (e.g., RSSI greater than a threshold) as potential relay neighbors and disregards neighbor nodes with poor signals. If the signal strength is greater than the threshold, the receiving node determines whether there is an entry in its locally stored neighbor list corresponding to the neighbor node (operation 314). If so, the receiving node updates the corresponding entry based on the received relay-state message (operation 316), and the process ends. Updating the corresponding entry can include updating the timestamp of the entry and the neighbor information included in the entry.

If an entry corresponding to the neighbor node does not exist in the locally stored neighbor list, the receiving node determines whether the locally stored neighbor list is full (operation 318). The locally stored neighbor list may be an array stored in a buffer with a predetermined depth. If the buffer is full, the receiving node may delete an entry in the buffer with the oldest timestamp and may add a new entry corresponding to the neighbor node sending the relay-state message (operation 320), and the process ends. If the locally stored neighbor list is not full, the receiving node can add a new entry corresponding to the neighbor node sending the relay-state message to the list and can increment the counter that counts the number of entries in the list, which corresponds to the number of relay neighbors (operation 322), and the process ends. Note that this counter value can be used in operation 214 shown in FIG. 2.

Entries in the neighbor list may become invalid or may expire after a predetermined time period. To ensure the validity of the entries, in some embodiments, a CRN may perform a validity-check operation on each entry based on the timestamp of the entry. For example, the CRN can obtain a time difference by comparing the timestamp of an entry and the current time and can determine whether the time difference equals or is greater than a predetermined expiration threshold. If so, the CRN can determine that the entry has expired and can delete the entry from the neighbor list. If the time difference is less than the expiration threshold, the CRN can further determine if the time difference equals or is greater than a predetermined broadcast interval. If so, the CRN can determine that, although the entry is not yet expired, its update is overdue. In such a situation, the CRN can send a state-request message to the corresponding neighbor, requesting the corresponding neighbor to send a relay-state message to refresh the entry. Being able to delete expired entries is important to ensure that a failed node can be detected and replaced in a timely manner. For example, if a CRN has a device failure, it may stop sending relay-state messages to its neighbors, resulting in the expiration of the corresponding entry. After the neighbors delete the failed CRN from their neighbor list, one or more of the neighbors may decide to turn on their relay function so that they can replace the failed CRN to perform the needed message-relay services.

The process for sending/broadcasting relay-state messages shown in FIG. 2 and the process for receiving relay-state messages shown in FIG. 3 can be independent of each other. A node (e.g., a CRN) in the network can send relay-state messages to its neighbors and can also receive relay-state messages from its neighbors. The timing of sending and receiving relay-state messages can be arbitrary. A node can first send a relay-state message to its neighbors and then can receive a relay-state message from one of its neighbors, or vice versa. In one embodiment, when a node is powered on or joins the network, it is preferable that the node receives relay-state messages from its neighbors before sending out its own relay-state messages.

Each CRN in the network can dynamically adjust its relay state (i.e., turning on or off its relay function) based on information included in the locally stored neighbor list. Note that changes of such information can reflect changes in the network, including topology changes (e.g., a node may be powered off or a new node may join the network) and relay-state changes (e.g., an active CRN becomes inactive or vice versa). In some embodiments, the CRN can execute a relay-decision algorithm to determine whether to adjust its relay state. For example, if a CRN determines that the number of its relay neighbors (i.e., active neighboring CRNs) exceeds or equals a predetermined threshold and these relay neighbors are all connected (e.g., they are also neighbors of each other), the CRN may turn off its relay function. Otherwise, the CRN may turn on its relay function. To prevent a CRN from adjusting its relay state too frequently thereby causing network instability, a state-adjust-protection interval can be introduced after the CRN adjusts its relay state. During the state-adjust-protection interval, the CRN cannot execute the relay-decision algorithm. The duration of the state-adjust-protection interval can be selected based on practical needs. In some embodiments, the default state-adjust-protection interval can be 120 seconds.

In some embodiments, a CRN may determine the connectivity status among its relay neighbors based on the neighbor information in the locally stored neighbor list. In one embodiment, the CRN may compare two entries in the neighbor list to determine whether it is the only relay node connecting the two corresponding neighbors. If so, the CRN may need to ensure that its relay function is turned on or remains on. Using the neighbor list shown in Table II as an example, based on the first entry in the neighbor list, the CRN (which can be referred to as node A) storing the list can determine that its neighbor A0 is also a neighbor (e.g., a one-hop neighbor) of A1, A2, and A3; and based on the second entry, node A can also determine that its neighbor A1 is also a neighbor of A0, A2, and A4. Accordingly, node A can determine that A1 and A2 are neighbors (e.g., one-hop neighbors) of each other and communication between A1 and A2 does not rely on A. On the other hand, by comparing the second and fourth entries, node A can determine that A3 is not a neighbor of A1. Hence, communication between A3 and A1 relies on the relay function of node A. In such a situation, node A needs to remain active (or in the relay-on state).

In one more example, a CRN A0 can have neighboring CRNs A1-A3, where A1 and A2 are active and A3 is inactive. CRN A0 can send relay-state messages to CRNs A1-A3, the relay-state message including the relay state of A0 and information associated with its active neighbors A1 and A2. Such information can include the address information and/or an identifier that can uniquely identify a node in the network. Similarly, nodes A1-A3 each can send its own relay-state messages to its neighboring CRNs; and A0 can also receive relay-state messages from A1-A3. For simplicity of description, a relay-state message sent by CRN A0 and CRNs A1-A3 can be written as: A0: 1, (A1, A2); A1: 1, (A0, A2, A4); A2: 1, (A0, A1, A3); A3: 0, (A0, A2, A6), respectively, where "0" indicates that the sending node is in the relay-off state and "1" indicates that the sending node is in the relay-on state. The nodes included in the parentheses are the active neighboring CRNs of the sending CRN.

Accordingly, a particular CRN can obtain, based on the relay-state messages sent by its neighbors, not only the relay states of its neighbors but also information regarding a number of target CRNs. A target CRN refers to an active neighbor of a neighbor of the particular CRN. Using the above CRN A0 as an example, it receives the following relay-state messages: A0: 1, (A1, A2); A1: 1, (A0, A2, A4); A2: 1, (A0, A1, A3); A3: 0, (A0, A2, A6). Using relay message A1: 1, (A0, A2, A4) as an example, the message indicates that, with regard to A0, A1 is a neighboring CRN in the relay-on state and A2 and A4 are target CRNs. Using relay message A3: 0, (A0, A2, A6) as an example, the message indicates that, with regard to A0, A3 is a neighboring CRN in the relay-off state and A2 and A6 are target CRNs. Based on the target CRNs corresponding to each neighbor of a particular CRN, the particular CRN can determine the connectivity among its neighboring CRNs. For example, by comparing the relay-state messages received by A0, A0 can determine that A1 and A2 are neighbors, and A2 and A3 are neighbors. Consequently, communication between A1 and A2 and between A2 and A3 does not need the relay function of A0. However, A0 can also determine that A1 and A3 are not neighbors. Hence, if CRN A0 turns off its relay function, A1 and A3 will not be able to communicate.

Once a CRN determines, based on the relay-state information and the connectivity status of its neighbors, that the CRN is the only relay node on the path between two of its neighbors, the CRN needs to turn on its relay function or remain in the relay-on state. On the other hand, if the CRN determines that all of its neighbors are neighbors of each other (i.e., they are all connected), meaning that those neighbors can communicate with each other without the relay function of the CRN, then the CRN can turn off its relay function or remain in the relay-off state. In other words, an essential CRN should switch to or remain in the relay-on state and a redundant CRN can switch to or remain in the relay-off state.

Figure 4A:
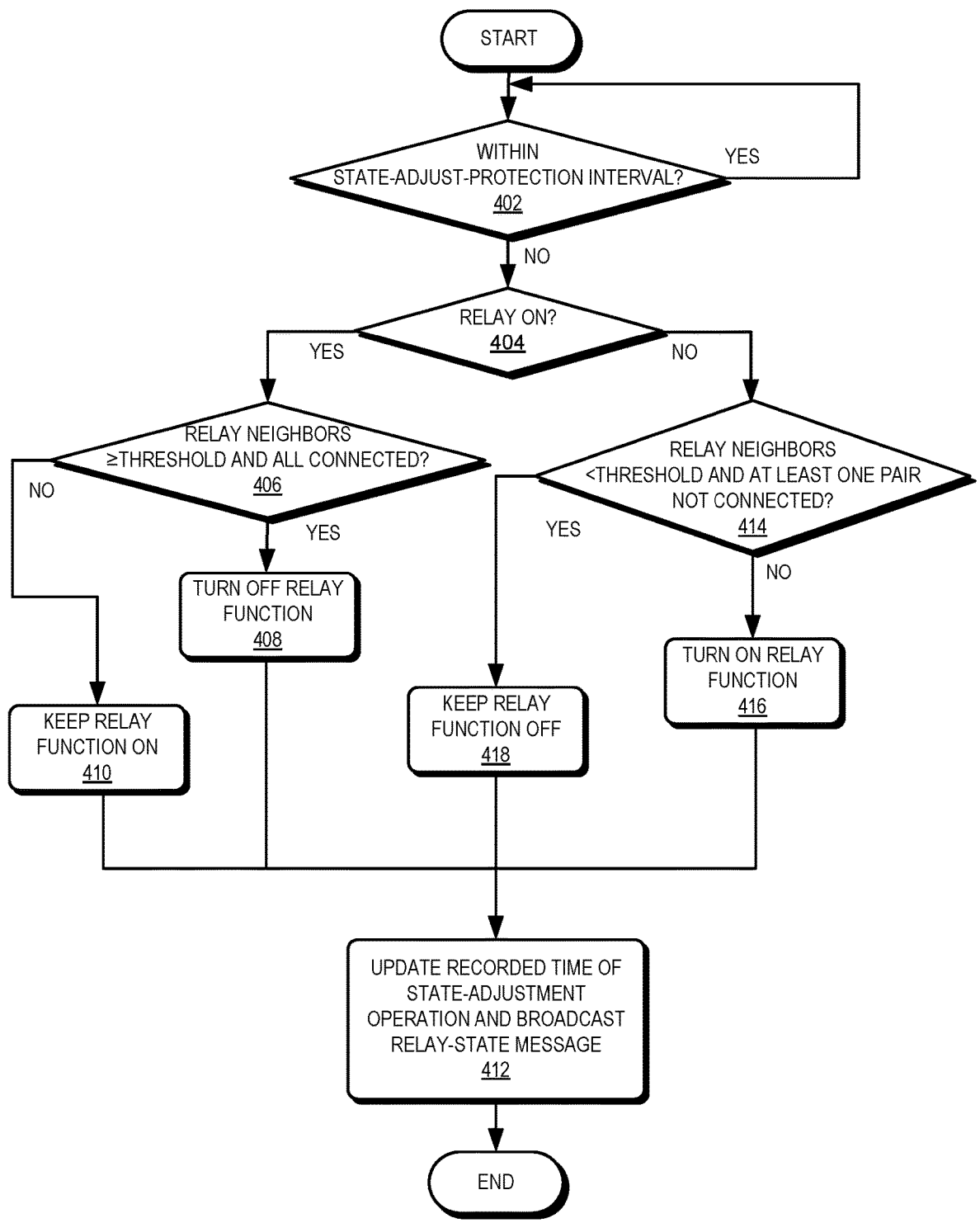
FIG. 4A presents a flowchart illustrating an exemplary process for making a relay decision, according to one embodiment.

FIG. 4A presents a flowchart illustrating an exemplary process for making a relay decision, according to one embodiment. During operation, a CRN determines whether it is currently within a state-adjust-protection interval (operation 402). In other words, the CRN determines whether its relay state has been adjusted recently (e.g., within the last two minutes) based on a recorded time of the most recent state-adjustment operation. If so, the CRN waits for the expiration of the state-adjust-protection interval. If not, the CRN determines whether its relay function is turned on (operation 404). If the CRN is in the relay-on state, the CRN determines whether the number of relay neighbors equals or exceeds a predetermined threshold and whether these relay neighbors are all connected (operation 406). In some embodiments, the CRN can determine the number of its relay neighbors and the connectivity status of its relay neighbors based on information included in its locally stored neighbor list, such as the neighbor list shown in Table II. If the number of relay neighbors equals or exceeds the predetermined threshold and these relay neighbors are all connected, the CRN can determine that it is redundant and can then turn off its relay function (operation 408). Otherwise, the CRN determines that it is not redundant and will keep its relay function on (operation 410). The CRN subsequently updates the recorded time of the most recent state-adjustment operation and broadcasts a relay-state message to the network (operation 412). Note that the broadcast relay-state message indicates the newly adjusted relay-state of the CRN.

If the CRN is in the relay-off state, the CRN determines whether the number of relay neighbors is less than a predetermined threshold and whether there is at least one pair of relay neighbors that are not connected (operation 414). If not, the CRN turns on its relay function (operation 416). Otherwise, the CRN remains in the relay-off state (operation 418). The CRN subsequently updates the recorded time of the most recent state-adjustment operation and broadcasts a relay-state message to the network (operation 412).

Figure 4B:
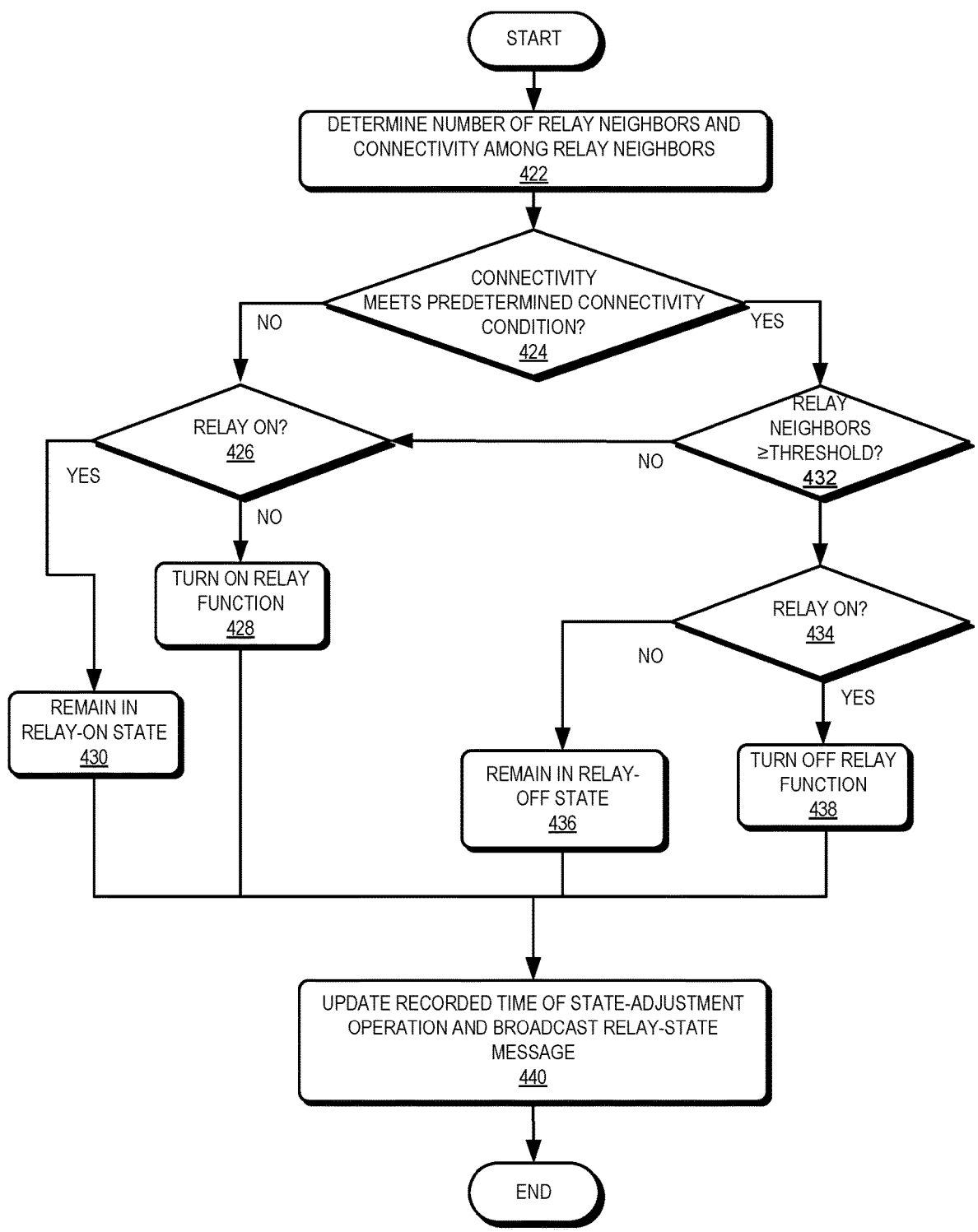
FIG. 4B presents a flowchart illustrating an alternative process for making a relay decision, according to one embodiment.

FIG. 4B presents a flowchart illustrating an alternative process for making a relay decision, according to one embodiment. During operation, a CRN determines the number of its relay neighbors and the connectivity among its relay neighbors (operation 422). Such determination can be made based on information included in the locally stored neighbor list. The CRN determines whether the connectivity status of its relay neighbors meets a predetermined connectivity condition (operation 424). In some embodiments, the predetermined connectivity condition can be that all relay neighbors are one-hop neighbors of each other (or all relay neighbors are directly connected to each other).

If the connectivity condition is not met (meaning that at least two relay neighbors of the CRN are not directly connected), the CRN determines whether it is in a relay-on state (operation 426). If not, the CRN adjusts its relay state from relay-off to relay-on (operation 428). Otherwise, the CRN maintains its relay-on state (operation 430).

If the connectivity condition is met (meaning that all relay neighbors of the CRN are directly connected to each other), the CRN determines whether the total number of its relay neighbors equals or exceeds a predetermined threshold value (operation 432). The threshold value can depend on the scale of the network. In one embodiment, the threshold value can be five. Other values are also possible, such as eight, ten, etc. If the total number of its relay neighbors is less than the threshold, the process goes to operation 426. Otherwise, the process goes to operation 434, where the CRN determines its relay state. If the relay state is off, the CRN remains in the relay-off state (operation 436). If the relay state is on, the CRN turns off its relay function (operation 438).

Subsequent to adjusting the relay state, the CRN updates the recorded time of the most recent state-adjustment operation and broadcasts a relay-state message to the network (operation 440).

Although appearing different, the processes shown in FIGS. 4A and 4B can achieve a similar goal, which is to adjust or set the relay state of a CRN based on the relay states and the connectivity status of its neighbors. In general, a CRN is expected to be in a "relay-on" state if it is considered essential and in a "relay-off" state if it is considered redundant. More specifically, a CRN is considered redundant if the number of its relay neighbors equals or exceeds a threshold and if all of its relay neighbors are directly connected to each other (e.g., any relay neighbor is also a one-hop neighbor of any other relay neighbor).

To ensure that the CRNs can timely adjust their relay state responsive to changes in the network (e.g., topology changes or changes in relay state of the nodes), in some embodiments, a CRN may periodically execute the relay-decision operation. In further embodiments, the interval between consecutive executions of the relay-decision operation can be adjusted. For example, when a node is powered on or joins the network, it may execute the relay-decision operation at a higher rate to reduce the time needed for electing active CRNs, thus enhancing the stability of the network.

Figure 5:
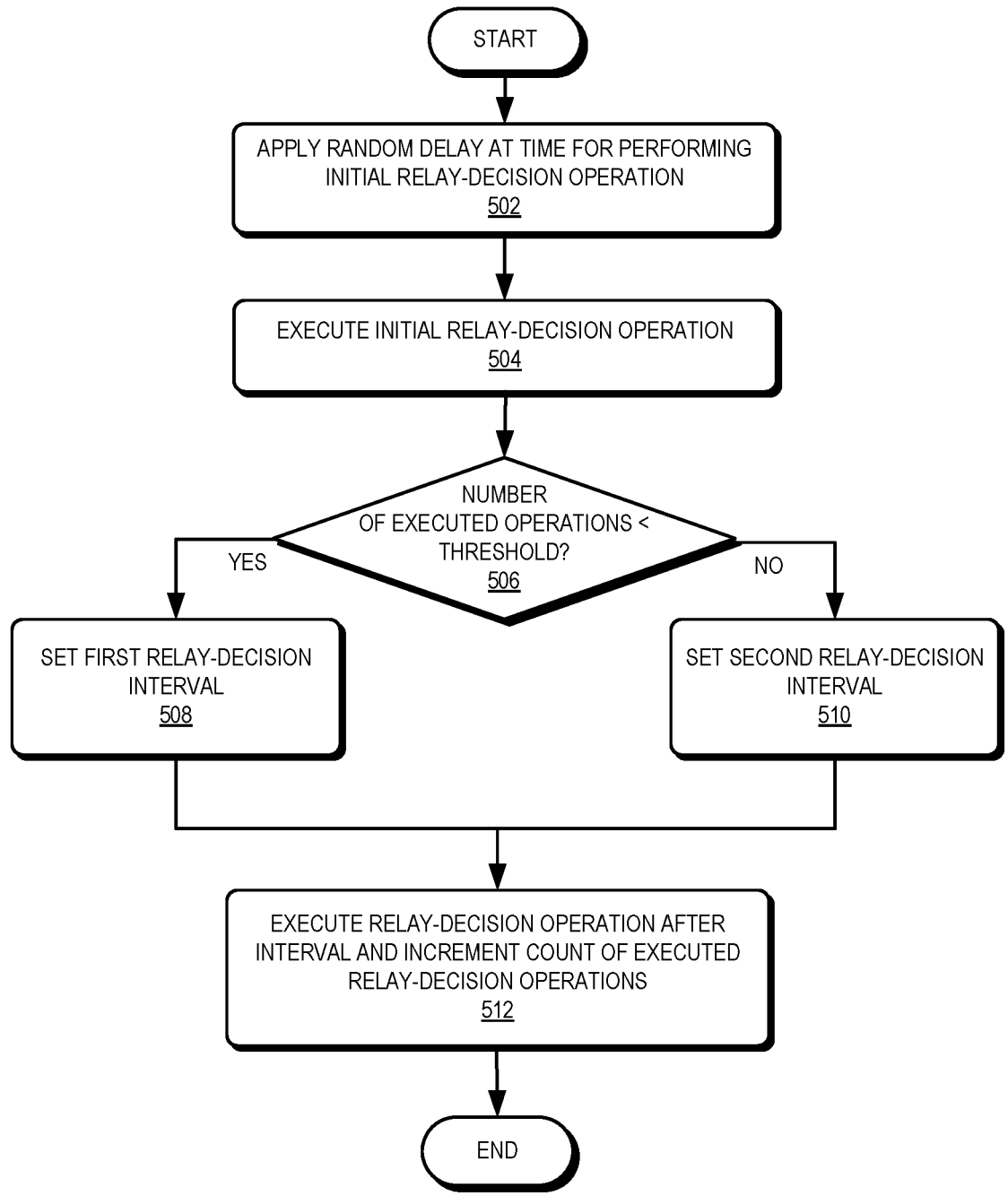
FIG. 5 presents a flowchart illustrating an exemplary process for executing the relay-decision operation, according to one embodiment.

FIG. 5 presents a flowchart illustrating an exemplary process for executing the relay-decision operation, according to one embodiment. During operation, a random delay can be applied when the time for performing an initial relay-decision operation arrives (operation 502). In some embodiments, when a node is powered on or connected to the network, an initial relay-decision operation is needed to set the relay state of the node. Applying the random delay prevents the situation where multiple newly powered or joined nodes perform the relay-decision simultaneously. In one embodiment, the random delay can be between 0 and 60 seconds.

Subsequent to the random delay, the node executes the initial relay-decision operation (operation 504). The relay-decision operation can be similar to the process shown in FIG. 4A or 4B. The node determines whether a count of the previously executed relay-decision operations is smaller than a threshold (operation 506). In one embodiment, the threshold value can be 10. Other values (e.g., 5, 8, 15, etc.) are also possible. If the number of previously executed relay-decision operations is smaller than the threshold, the node can set a first relay-decision interval (operation 508). Otherwise, the node can set a second relay-decision interval (operation 510). In some embodiments, the second relay-decision interval can be the default interval (e.g., 70 seconds) for performing relay-decision operations. The first relay-decision interval is smaller than the second relay-decision interval to ensure that the node executes the relay-decision operation at a higher rate at the beginning of being powered on or joining the network. In some embodiments, the first relay-decision interval can be half, one-third, or one-fourth, etc., of the second relay-decision interval. In one embodiment, the first relay-decision interval can be 10 seconds. The node subsequently performs the relay-decision operation after the interval and increments the count of the executed relay-decision operations (operation 512).

As discussed previously, each time a node adjusts its relay state, it enters a state-adjust-protection interval, during which the node does not adjust its relay state to prevent the relay state from being adjusted too frequently, which may cause network instability. The state-adjust-protection interval is typically much longer than the first or second relay-decision interval set during operation 508 or 510, respectively. Hence, if a relay-decision operation is scheduled to occur during the state-adjust-protection interval, the node can skip the relay-decision operation until the expiration of the state-adjust-protection interval.

Flooding Detection and Protection

Flooding may occur in the mesh work when there are a large number of messages being relayed, causing congestion. The congested network may result in failures in the transmission of the relay-state messages, which may lead to long-term instability in the network. In some embodiments, when the network is flooded with excessive relayed messages, CRNs in the network may randomly turn off their relay functions to reduce the flooding. The CRNs can gradually turn on their relay functions based on relay-state messages received from their neighbors once there is no more flooding in the network. It is important that flooding can be timely detected and resolved. In some embodiments, each CRN can set a flooding indicator (e.g., a flood_flag field) to indicate that flooding has been detected.

More specifically, each CRN can include a relay buffer for temporarily storing to-be-relayed messages. When an active CRN receives a broadcast message, it may determine whether it is the destination of the message. If not, the CRN is configured to relay (or re-broadcast) the message. Before relaying the message, the CRN can check its relay buffer to determine whether the relay buffer has a copy of the message. If so, the CRN can discard the received message. If not, the CRN stores the message in its relay buffer. The size of the relay buffer can be designed to meet the buffering need under normal network operating conditions. However, when flooding occurs in the network, the CRN may receive many to-be-relayed messages, which can cause overflow of its relay buffer. When the relay buffer overflows, a CRN may clear the relay buffer (e.g., delete all messages) or may delete older messages from the relay buffer. When flooding occurs, the relay buffer may frequently overflow. Hence, by detecting the occurrence frequency of the relay-buffer overflow, a CRN can determine if the network is flooded. If frequent flooding is detected, the system may determine that there are too many relay nodes. In response, the system can adjust the relay neighbor threshold value, which is used in the operations shown in FIG. 4A and FIG. 4B. More specifically, the relay neighbor threshold value can decrement by one each time a flooding event is detected until a minimum value is reached. For example, the default relay neighbor threshold value can be five and the minimum value of the relay neighbor threshold can be three. Each time a flooding event is detected, the relay neighbor threshold can decrement by one until it reaches the minimum value of three. The reduced relay neighbor threshold value may lead to the reduction of active CRNs in the network, thus reducing the number of messages being relayed. On the other hand, the minimum relay neighbor threshold value can ensure sufficient relay coverage in the network.

Figure 6:
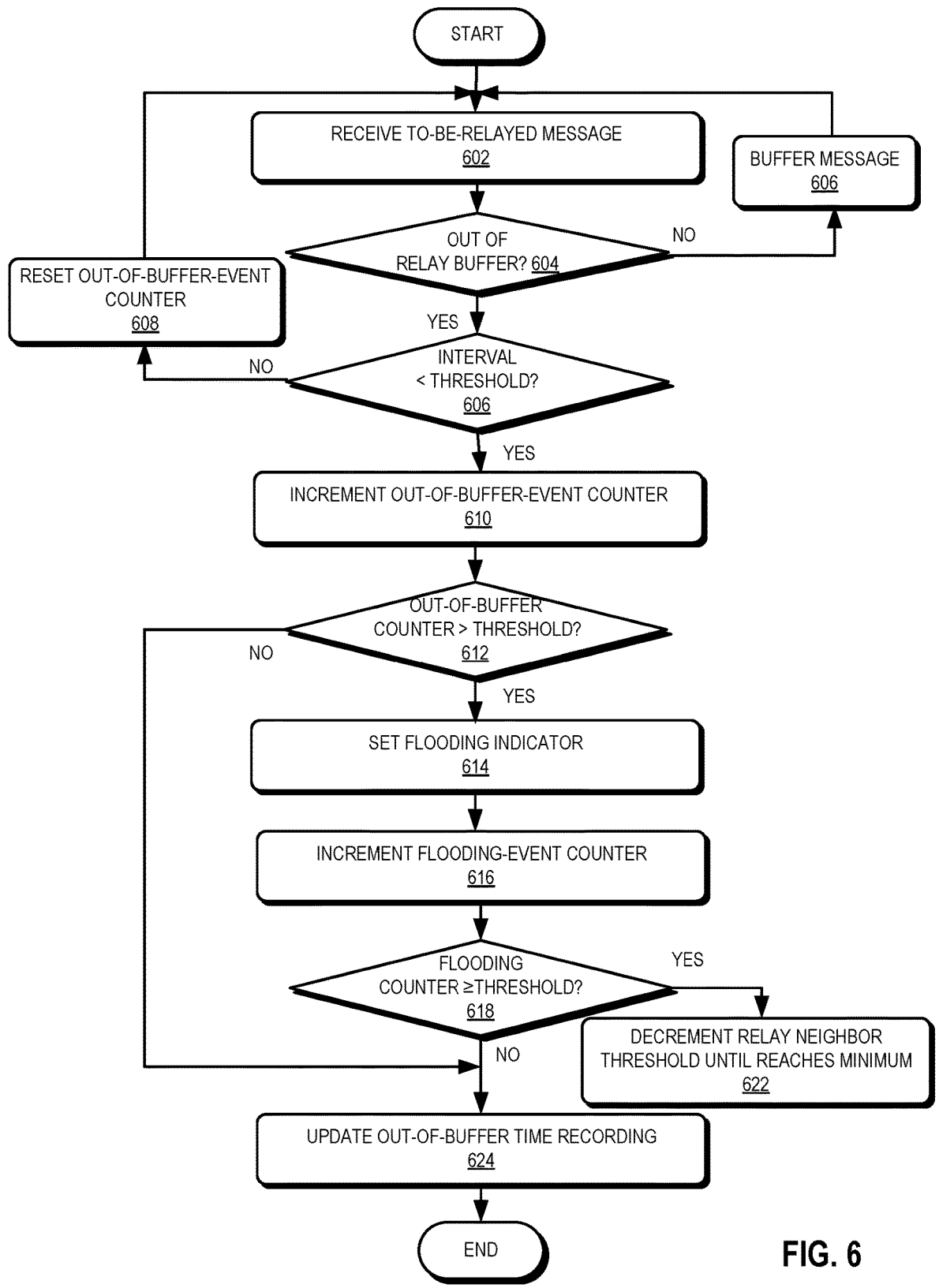
FIG. 6 presents a flowchart illustrating an exemplary process for detecting flooding events in the network, according to one embodiment.

FIG. 6 presents a flowchart illustrating an exemplary process for detecting flooding events in the network, according to one embodiment. During operation, the CRN receives a to-be-relayed message (operation 602) and determines whether it is out of relay buffer (operation 604). If not, the CRN buffers the message (operation 606) and continues to receive to-be-relayed messages (operation 602).

If an out-of-relay-buffer event occurs, the CRN can determine whether a time interval between two consecutive out-of-relay-buffer events is less than a threshold (operation 606). If not, the CRN determines that the out-of-relay-buffer event is not caused by flooding and resets a counter of the out-of-relay-buffer events to zero (operation 608) and continues to receive to-be-relayed messages (operation 602). Otherwise, the CRN increments the counter of the out-of-relay-buffer events (operation 610). The threshold for the time interval between two consecutive out-of-relay-buffer events can be determined based on practical applications. In one embodiment, the threshold can be three seconds.

The CRN then determines whether the counter value of the out-of-relay-buffer events exceeds a predetermined threshold (e.g., three) (operation 612). If so, the CRN detects flooding and sets the flooding indicator to "1" (operation 614). The CRN increments a counter of the flooding events (operation 616) and determines whether the value of the flooding-event counter equals or exceeds a predetermined threshold (e.g., two) (operation 618). If so, the CRN decrements the relay neighbor threshold value by one until a minimum value is reached (operation 622). The CRN subsequently updates a time recording of the out-of-buffer event (operation 624).

Figure 7:
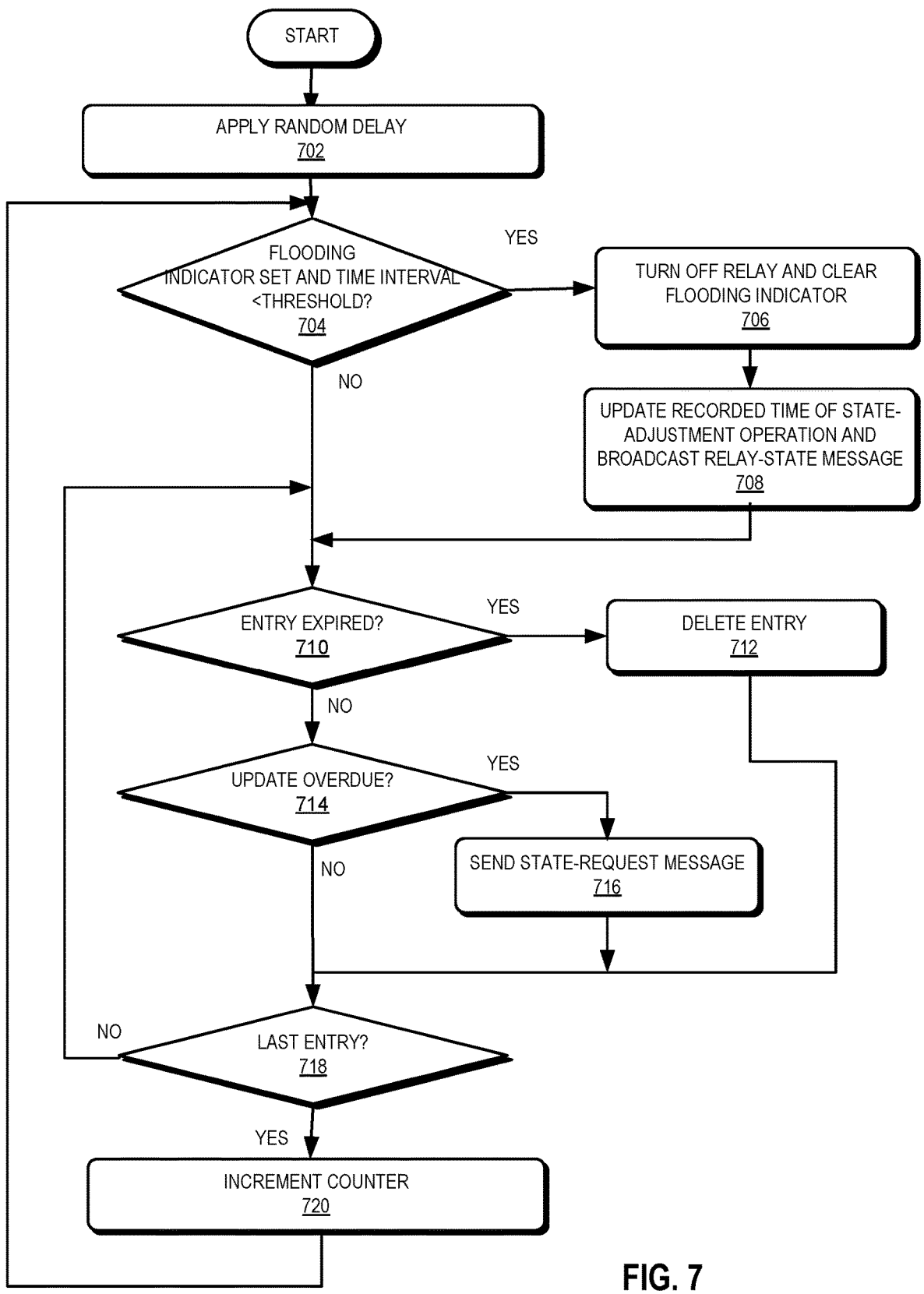
FIG. 7 presents a flowchart illustrating an exemplary process for checking the validity of entries in the neighbor list, according to one embodiment.

Once a CRN detects flooding in the network, it can turn off its relay function. In some embodiments, while checking for the validity of entries in the locally stored neighbor list, a CRN can monitor flooding events at the same time. FIG. 7 presents a flowchart illustrating an exemplary process for checking the validity of entries in the neighbor list, according to one embodiment. During operation, a random delay can be applied (operation 702). In some embodiments, the random delay can be between 0 and 60 seconds. Applying the random delay can prevent multiple CRNs from turning off their relay functions simultaneously.

A CRN can determine whether its flooding indicator is set and whether a time interval from the most recent out-of-buffer event is less than a predetermined threshold (e.g., three seconds) (operation 704). If so, the CRN turns off its relay function and clears the flooding indicator (i.e., sets it to "0") (operation 706). The CRN subsequently updates the recorded time of the most recent state-adjustment operation and broadcasts a relay-state message to the network (operation 708).

If the flooding indicator is not set or if a time interval from the most recent out-of-buffer event equals or exceeds the predetermined threshold, the CRN checks the timestamp of an entry in its locally stored neighbor list to determine whether the entry has expired (operation 710). If so, the entry is deleted from the neighbor list (operation 712). In some embodiments, the entry expiration time can be 90 seconds, which is typically longer than the broadcast interval of relay-state messages.

If the entry is not expired, the CRN can determine whether an interval since the last update of the entry exceeds a time threshold (i.e., whether an update is overdue) (operation 714). The time threshold can be longer than the broadcast interval of relay-state messages but shorter than the entry expiration time. In some embodiments, the time threshold for updating an entry can be 70 seconds. If the entry has not been updated after this time threshold, the CRN can send a state-request message to the corresponding relay neighbor to request its relay state and neighbor information (operation 716).

The CRN determines whether the entry is the last entry in the neighbor list (operation 718). If not, the CRN checks the validity of the next entry (operation 710). If all entries have been checked, the CRN increments a counter for the validity-checking operation (operation 720) and then returns to operation 704.

Centralized Control

Figure 8:
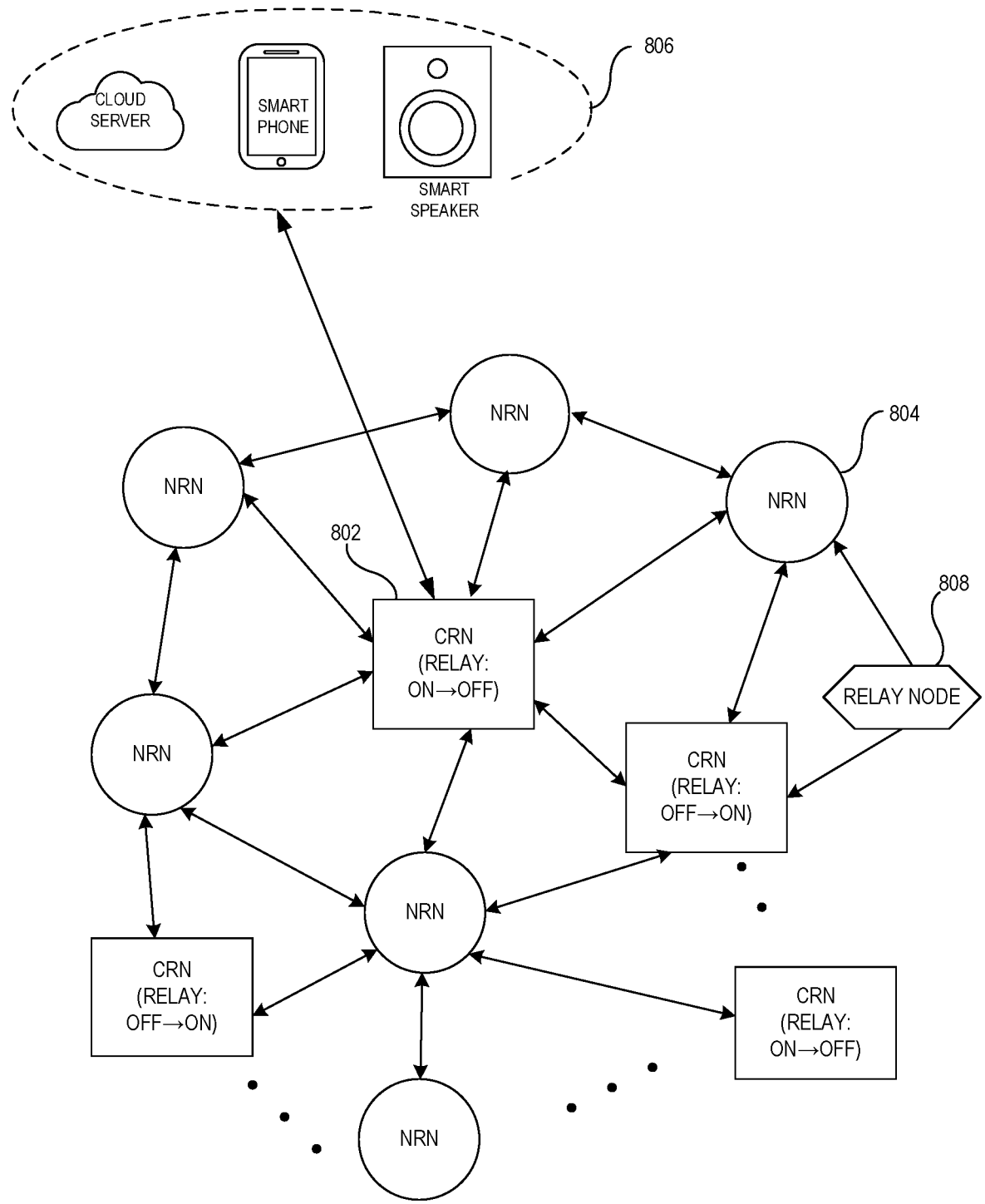
FIG. 8 illustrates an exemplary mesh network with a centralized controller node, according to one embodiment.

In the above-discussed examples, individual CRNs make their own relay decisions based on relay-state messages received from their neighbors. In other words, the relay state (relay-on or relay-off) of the CRNs is controlled in a distributive manner. In alternative embodiments, a centralized-control mechanism can also be used to control the relay state of CRNs in the network. For example, the wireless network can include a centralized controller, which can reside in the gateway of the network, the cloud-based network control platform, or a node with a higher processing power. FIG. 8 illustrates an exemplary network with a centralized controller node, according to one embodiment. A network 800 can include a plurality of CRNs (e.g., CRN 802), a plurality of NRNs (e.g., NRN 804), and a centralized controller node 806.

The CRNs and NRNs in network 800 can be similar to the CRNs and NRNs in network 100 shown in FIG. 1. Centralized controller node 806 can be a computing device with a relatively better processing capability than low energy Bluetooth devices. Centralized controller node 806 can include terminal devices (e.g., a smartphone, a personal computer (PC), a wearable device, a gateway of the Bluetooth network, etc.) and servers (e.g., a standalone server, a server array or cluster, a cloud server, etc.). Centralized controller node 806 can be responsible for receiving relay-state messages from all nodes in the network and for making relay decisions for all nodes in the network. For example, based on the network topology, the distribution of the CRNs, and their signal strengths, centralized controller node 806 can determine which CRNs should be placed in the relay-on state and which CRNs should be placed in the relay-off state. In some embodiments, the centralized control node can maintain a neighbor list for each CRN and can update the neighbor lists based on relay-state messages received from the CRNs.

In some embodiments, centralized controller node 806 can send relay-configuration messages to the CRNs. A relay-configuration message can include relay-configuration parameters associated with the relay function of a CRN. The relay-configuration parameters can include but are not limited to: the relay-function enable signal, the interval for broadcasting relay-state messages, the interval for making a relay decision, the signal-strength threshold, the neighbor-list entry expiration threshold, the neighbor-list entry update threshold, the state-adjust-protection interval, etc. Upon receiving a relay-configuration message from centralized controller node 806, a CRN can adjust its various local parameters associated with the relay function.

In certain situations, a CRN may adjust its relay-configuration parameters according to current changes in the network. Therefore, in addition to sending the relay-configuration messages to CRNs in the network, centralized controller node 806 can also send relay-configuration-request messages to the CRNs, requesting the CRNs to report their current relay-configuration parameters. In some embodiments, the CRNs can send relay-configuration-response messages to centralized controller node 806. The relay-configuration-response message can include the current relay-configuration parameters implemented by the CRN.

In some embodiments, the default setting of a relay-configuration-request message is to request a CRN to report all of its relay-configuration parameters. In alternative embodiments, a relay-configuration-request message sent by centralized controller node 806 can include a set of parameter identifiers to specify a set of relay-configuration parameters to be included in the corresponding relay-configuration-response message. The parameter identifier can include the name, ID, or serial number, etc., of a parameter, which can be used to identify a certain relay-configuration parameter. When the CRN receives the relay-configuration-request message, it can determine, based on the parameter identifiers included in the message, a set of relay-configuration parameters to be included in a corresponding relay-configuration-response message.

The format of the relay-configuration message (which sets the configuration parameters of a CRN) and the relay-configuration-response message (which reports the current configuration parameters implemented by a CRN) can be similar. Table III presents the exemplary format of a relay-configuration-response message.

TABLE III

| FIELD | LENGTH (BYTE) | MEANING |
|---|---|---|
| OPCODE | 2 | 0X80 0X72 |
| RELAY ENABLE | 1 | Indicate state of the relay function: "1" means on, and "0" means off, default setting is "1" |
| RELAY NEIGHBOR THRESHOLD N | 1 | Minimum number of relay neighbors needed before turning off the relay function, default setting is "5" |
| RSSI THRESHOLD | 1 | A neighbor is considered a relay neighbor (increment the relay neighbor count) only if the RSSI is greater than the threshold, default setting is −90 |
| RELAY-STATE-BROADCAST INTERVAL | 1 | Periodic time interval for broadcasting relay-state messages, default setting is 60 seconds |
| RELAY-DECISION INTERVAL | 1 | Periodic time interval for executing relay-decision operations, default setting is 70 seconds |
| NEIGHBOR ENTRY UPDATE | 1 | The time threshold for requesting a neighbor to send relay-state message, default setting is 70 seconds |

In addition to being used in the centralized control scenario, the relay-configuration messages can also be used in the distributed control scenario. More specifically, the CRNs may be configured according to the Bluetooth Mesh Foundation models (e.g., the Configuration Client model). For example, a CRN may be preconfigured by its manufacturer or may be configured by the user when it first joins the network.

In the example shown in FIG. 8, in addition to CRNs and NRNs, network 800 can also include one or more conventional relay nodes, such as relay node 808. A conventional relay node refers to a relay node that cannot be configured or controlled to turn on or off its relay function. Instead, a conventional relay node will always relay messages from other nodes, including CRNs, NRNs, or other conventional relay nodes. This disclosure does not limit the network topology formed by the CRNs, NRNs, and conventional relay nodes. For example, the CRNs, NRNs, and conventional relay nodes can form a star topology, a tree topology, a ring topology, a mesh topology, etc.

Figure 9:
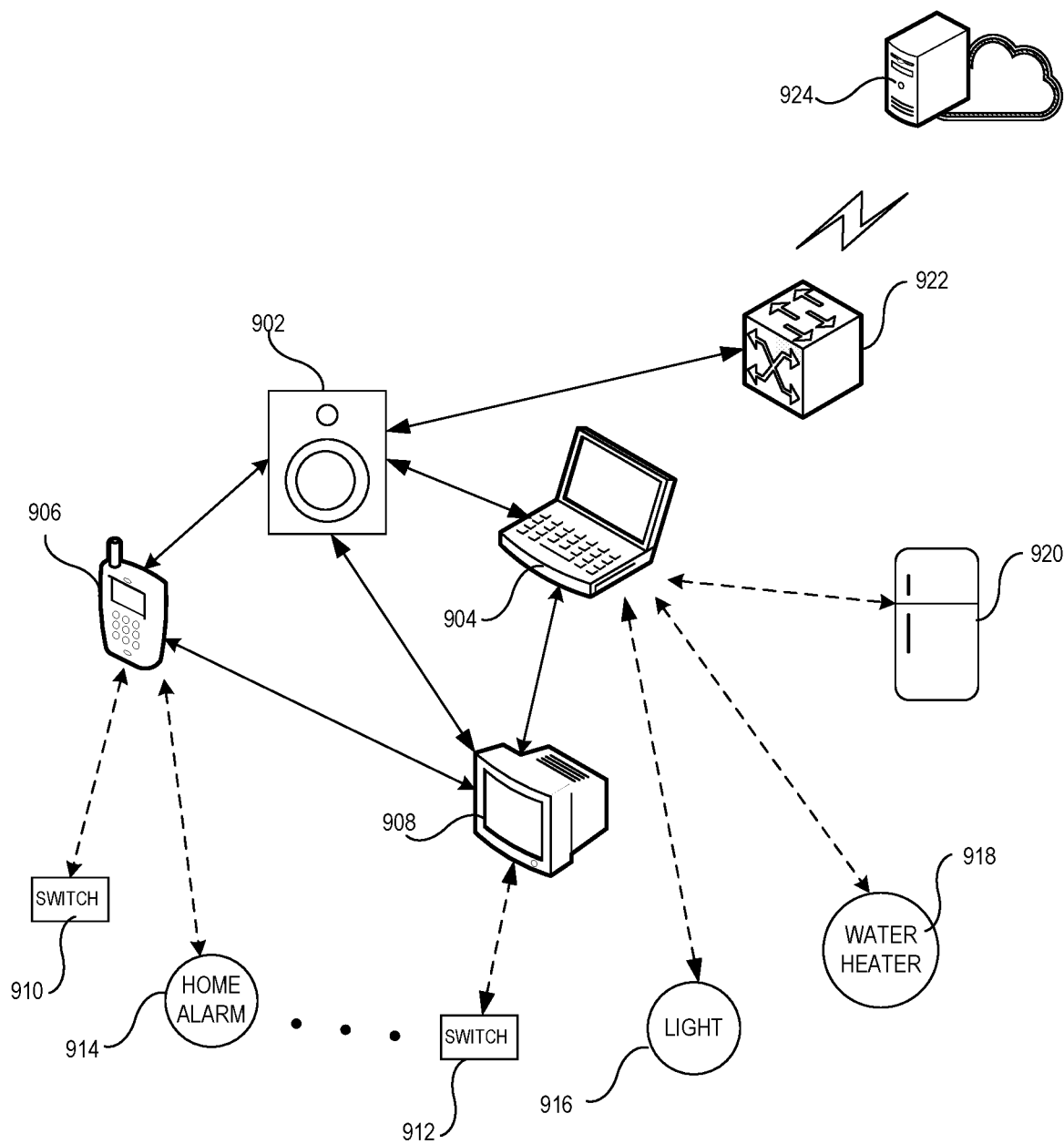
FIG. 9 illustrates an exemplary application scenario, according to one embodiment.

FIG. 9 illustrates an exemplary application scenario, according to one embodiment. In FIG. 9, the Bluetooth network is used in the setting of a smart home. A smart home network 900 can include a plurality of Bluetooth devices supporting Bluetooth Mesh standard. More specifically, a number of devices, including a smart speaker 902, a laptop computer 904, a smartphone 906, and a smart TV 908, can function as CRNs, whereas other devices, including switches 910 and 912, a home alarm 914, a light 916, a water heater 918, and a smart refrigerator 920, can function as NRNs. A router 922 can be the gateway of smart home network 900 and can establish a communication link to a cloud server 924. In some embodiments, cloud server 924 can be the centralized controller node in smart home network 900 and can be responsible for configuring and controlling all nodes, including all CRNs in the network. The NRNs, including switches 910 and 912, home alarm 914, light 916, water heater 918, and smart refrigerator 920, can join smart home network 900 by sending a network-join request and by completing the network configuration operation to become Bluetooth nodes.

During operation, a user can issue a voice command to smart speaker 902, the voice command specifying an object of the command and a to-be-performed action. In one example, a user can issue a voice command "turn on the light" to smart speaker 902. Upon receiving the voice command, smart speaker 902 can determine that the object of the command is light 916 and the action is "turn on." Smart speaker 902 can then broadcast a Bluetooth message for turning on light 916. Smart TV 908 is the one-hop neighbor of smart speaker 902 and is an active CRN. Upon receiving the broadcast message for tuning on the light, smart TV 908 relays (e.g., re-broadcasts) the message to network 900. Light 916 is the one-hop neighbor of smart TV 908 and can receive the "turn on the light" message relayed by smart TV 908. In response, light 916 can perform the action of turning on.

In the examples shown in FIG. 1, FIG. 8, and FIG. 9, the wireless network is a Bluetooth Mesh network. In practice, similar solutions can be used in other types of wireless networks implementing other types of wireless communication protocols. For example, a wireless network can implement one of the following protocols: the infrared (IR) protocol, the ultra-wideband (UWB) protocol, the near-field communication (NFC) protocol, the Wi-Fi protocol, etc. Like the networks shown in FIG. 1, FIG. 8, or FIG. 9, the wireless network can include CRNs and NRNs, with the CRNs being capable of turning on or off their relay functions. When its relay function is turned on, a CRN is able to relay packets (e.g., via broadcasting) to other nodes in the network. To prevent excessive packet relaying (or re-broadcasting), each CRN can dynamically adjust its relay state based on relay-state packets received from its neighbors. A relay-state message sent by a CRN includes the sending CRN's relay-state information as well as information associated with its relay neighbors (which are neighboring CRNs in the relay-on state). Based on the received relay-state packets, a CRN can identify its relay neighbors and can determine their connectivity status. When a CRN has a sufficient number of relay neighbors and when these relay neighbors are also neighbors of each other, the CRN may be considered redundant and can turn off its relay function. This way, the number of CRNs that actively relay packets can be kept to a minimum value, thus significantly reducing the amount of unnecessary relay traffic, increasing the throughput of the network.

Figure 10:
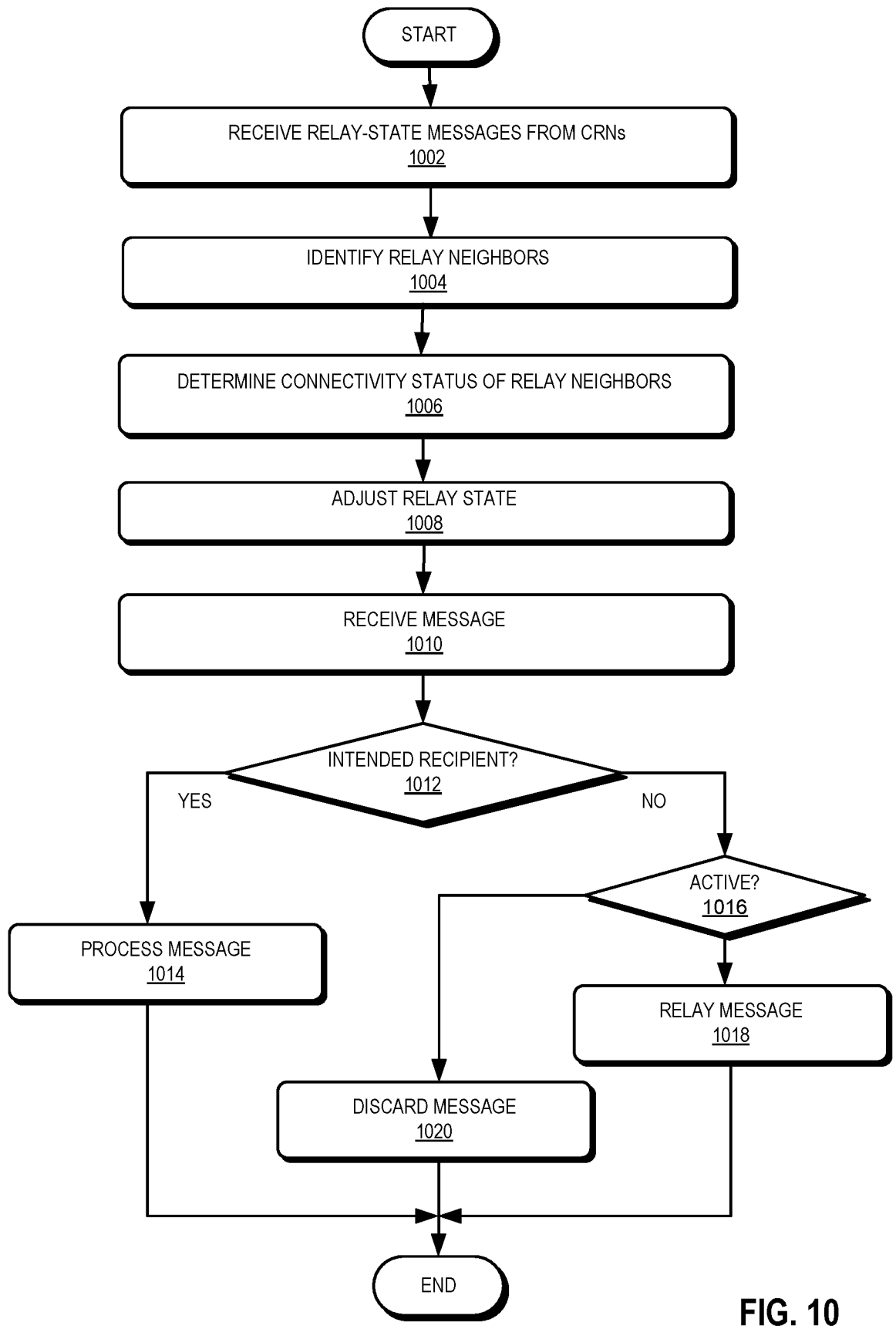
FIG. 10 illustrates an exemplary communication process in a Bluetooth Mesh network, according to one embodiment.

FIG. 10 illustrates an exemplary communication process in a Bluetooth Mesh network, according to one embodiment. During operation, a CRN receives a plurality of relay-state messages from a plurality of CRNs in the network (operation 1002). In some embodiments, the relay-state messages are configured to have a predetermined TTL value (e.g., TTL=0) such that they can only be received by neighbors within a predetermined range (e.g., one-hop neighbors). Based on the received relay-state messages, the CRN can identify its relay neighbors (operation 1004). Note that the relay neighbors are neighboring CRNs that are in a relay-on state. In other words, the relay neighbors of a CRN are neighboring nodes that can relay messages sent by the CRN.

Moreover, based on the relay-messages, the CRN can determine the connectivity status of its relay neighbors (operation 1006). In some embodiments, the CRN can maintain a neighbor list, with different entries in the neighbor list corresponding to different relay neighbors. A respective neighbor entry can include address information as well as neighbor information (e.g., relay neighbors) associated with the corresponding relay neighbor. The connectivity status of the relay neighbors can be determined by comparing the corresponding entries in the neighbor list. For example, the connectivity status of the relay neighbors can be all connected (meaning that the relay neighbors are also immediate neighbors of each other) or partially connected (meaning that there are at least two relay neighbors not directly connected). Note that, because the network is dynamic (nodes may be removed, new nodes may join, nodes may adjust their relay states), the CRN continuously receives relay-state messages and can continuously update its neighbor list.

Based on the identified relay neighbors and their connectivity status, the CRN can adjust its relay state (turn on or turn off its relay function) (operation 1008). For example, the CRN can execute a relay-decision operation to determine an expected relay state ("relay-on" or "relay-off") and can then adjust its relay state accordingly. For example, if the expected relay state is "on" and the CRN is currently off, then the CRN can turn on its relay function, and vice versa. If the expected relay state and the current relay state are the same, the CRN can maintain its current relay state. Because the relay neighbors and their connectivity status are dynamic, the CRN dynamically adjusts its relay state to meet the traffic demand of the network.

The CRN can receive a data message from the network (operation 1010) and determines whether it is the intended recipient (operation 1012). If so, the CRN processes the message (operation 1014). If not, the CRN can determine whether it is active (or in the relay-on state) (operation 1016). If so, the CRN relays the message (operation 1018). For example, the CRN may re-broadcast the message to the network to allow its neighbors to receive the message. If the CRN is inactive, it is not able to relay the message and will discard the message (operation 1020).

In the example shown in FIG. 10, all operations can be performed by the CRN, including receiving relay-state messages (operation 1002), identifying the relay neighbors (operation 1004), determining their connectivity status (operation 1006), and adjusting the relay state (operation 1008). In alternative embodiments, these operations can be performed by a centralized controller, which receives relay-state messages from all CRNs (operation 1002). For each CRN, the centralized controller can identify its relay neighbors (operation 1004), determine the connectivity status of these relay neighbors (1006), and then adjust the relay state of the CRN (operation 1008).

Figure 11:
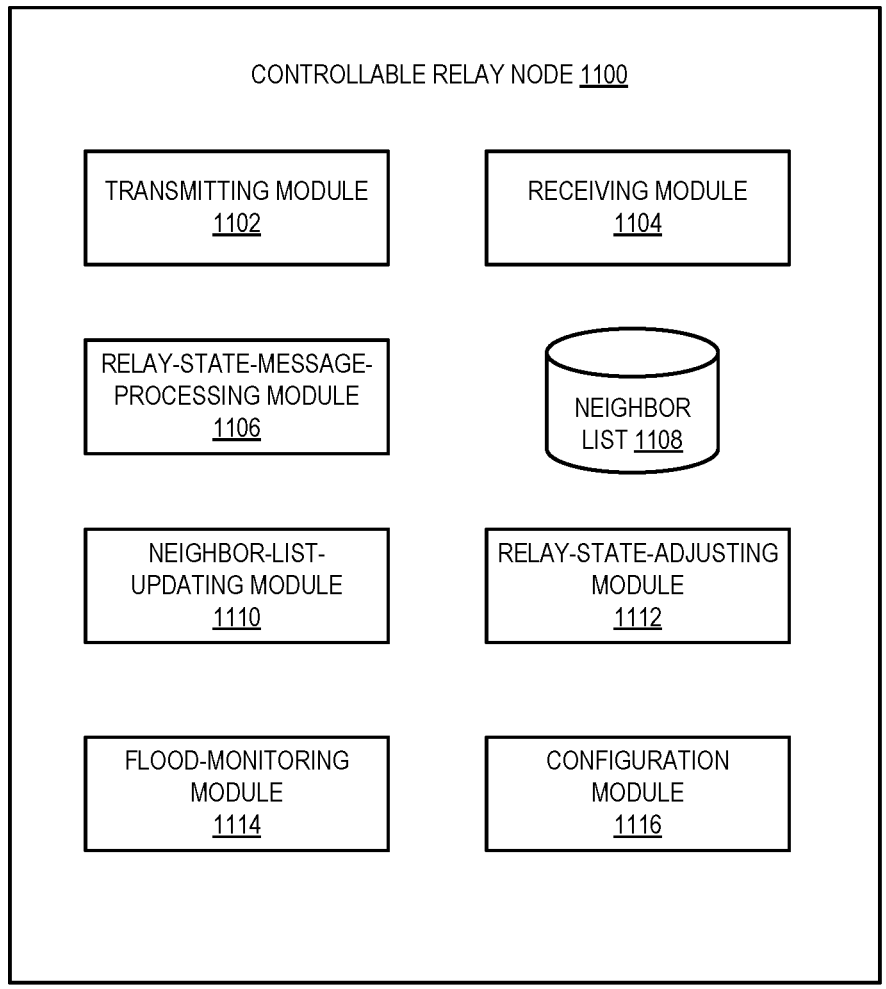
FIG. 11 illustrates a block diagram of an exemplary controllable relay node (CRN), according to one embodiment.

FIG. 11 illustrates a block diagram of an exemplary controllable relay node (CRN), according to one embodiment. A CRN 1100 can include a transmitting module 1102, a receiving module 1104, a relay-state-message-processing module 1106, a neighbor-list database 1108, a neighbor-list-updating module 1110, a relay-state-adjusting module 1112, a flood-monitoring module 1114, and a configuration module 1116.

CRN 1100 can be a node in a wireless network that is capable of relaying messages received from other nodes in the network. In some embodiments, the wireless network is a Bluetooth Mesh network and CRN 1100 is a Bluetooth node that supports the Bluetooth Mesh standards.

Transmitting module 1102 is responsible for transmitting packets/messages to the network. Receiving module 1104 is responsible for receiving packets/messages from the network. In some embodiments, transmitting module 1102 and receiving module 1104 can be part of a Bluetooth radio and can transmit/receive messages according to various Bluetooth standards. The transmitted and received messages can include both data messages and control messages. Examples of the control messages can include relay-state messages, state-request messages, relay-configuration messages, relay-configuration-request messages, relay-configuration-response messages, etc.

Relay-state-message-processing module 1106 can be responsible for processing received relay-state messages. In some embodiments, the TTL value of the relay-state messages is configured such that relay-state messages can only be received by the neighbors (e.g., one-hop neighbors) of the sending CRN. Relay-state-message-processing module 1106 can timestamp and parse each received relay-state message to obtain relay-state information as well as relay-neighbor information associated with the sender of the relay-state message.

Neighbor-list database 1108 stores a neighbor list, with each entry in the list corresponding to a current relay neighbor of CRN 1100. More specifically, a neighbor-list entry can include a neighbor identifier, a timestamp, and a list of relay neighbors of the corresponding neighbor. Information in the neighbor list can be obtained from relay-state-message-processing module 1106.

Neighbor-list-updating module 1110 can be responsible for updating the neighbor list in neighbor-list database 1108. More specifically, neighbor-list-updating module 1110 can update entries in the neighbor list based on information provided by relay-state-message-processing module 1106. For example, relay-state-message-processing module 1106 may determine that the relay state of a previous relay neighbor has changed from "on" to "off." Accordingly, neighbor-list-updating module 1110 can delete the corresponding entry. Moreover, neighbor-list-updating module 1110 can periodically check the validity of entries in the neighbor list to determine whether to delete an entry or request that the entry be updated by the corresponding neighbor.

Relay-state-adjusting module 1112 can be responsible for making relay-state decisions. In some embodiments, relay-state-adjusting module 1112 can execute a relay-decision operation based on information included in the neighbor list. More specifically, relay-state-adjusting module 1112 can compare the count of relay neighbors with a threshold and can determine a connectivity status of the relay neighbors. Based on the count and the connectivity status, relay-state-adjusting module 1112 can adjust (e.g., turn "on" or "off") the relay state of CRN 1100. When centralized control is used, relay-state-adjusting module 1112 does not need to execute the relay-decision operation; instead, relay-state-adjusting module 1112 can adjust the relay state of CRN 1100 based on a relay-configuration message sent from a centralized controller.

Flood-monitoring module 1114 can be responsible for monitoring flooding events in the network. In some embodiments, flood-monitoring module 1114 can monitor the relay buffer (not shown in FIG. 11) to determine whether flooding occurs in the network based on the counts and intervals of relay-buffer-overflow events. In some embodiments, once flooding is detected, relay-state-adjusting module 1112 can turn off the relay state of CRN 1100 to reduce the number of relay messages in the network. Moreover, if flood-monitoring module 1114 detects frequent flooding, it can instruct relay-state-adjusting module 1112 to adjust certain parameters used during the relay-decision operation (e.g., decrementing the relay neighbor threshold).

Configuration module 1116 can be responsible for configuring CRN 1100. For example, configuration module 1116 can receive, from the centralized controller, relay-configuration messages, which specify a number of parameters pertaining to the relay function. Alternatively, configuration module 1116 can also receive the relay-configuration parameters from users. If CRN 1110 includes a user input module (e.g., a touchscreen or a keyboard), the user can directly send the relay-configuration parameters. If CRN 1110 does not include a user input module, a user may need to interact with configuration module 1116 via a controller device (e.g., a smartphone or a tablet computer) capable of receiving use input. In addition to receiving relay-configuration messages, configuration module 1116 can also receive relay-configuration-request messages that request the relay-configuration parameters implemented by CRN 1100. In response, configuration module 1116 can also send relay-configuration-response messages.

Figure 12:
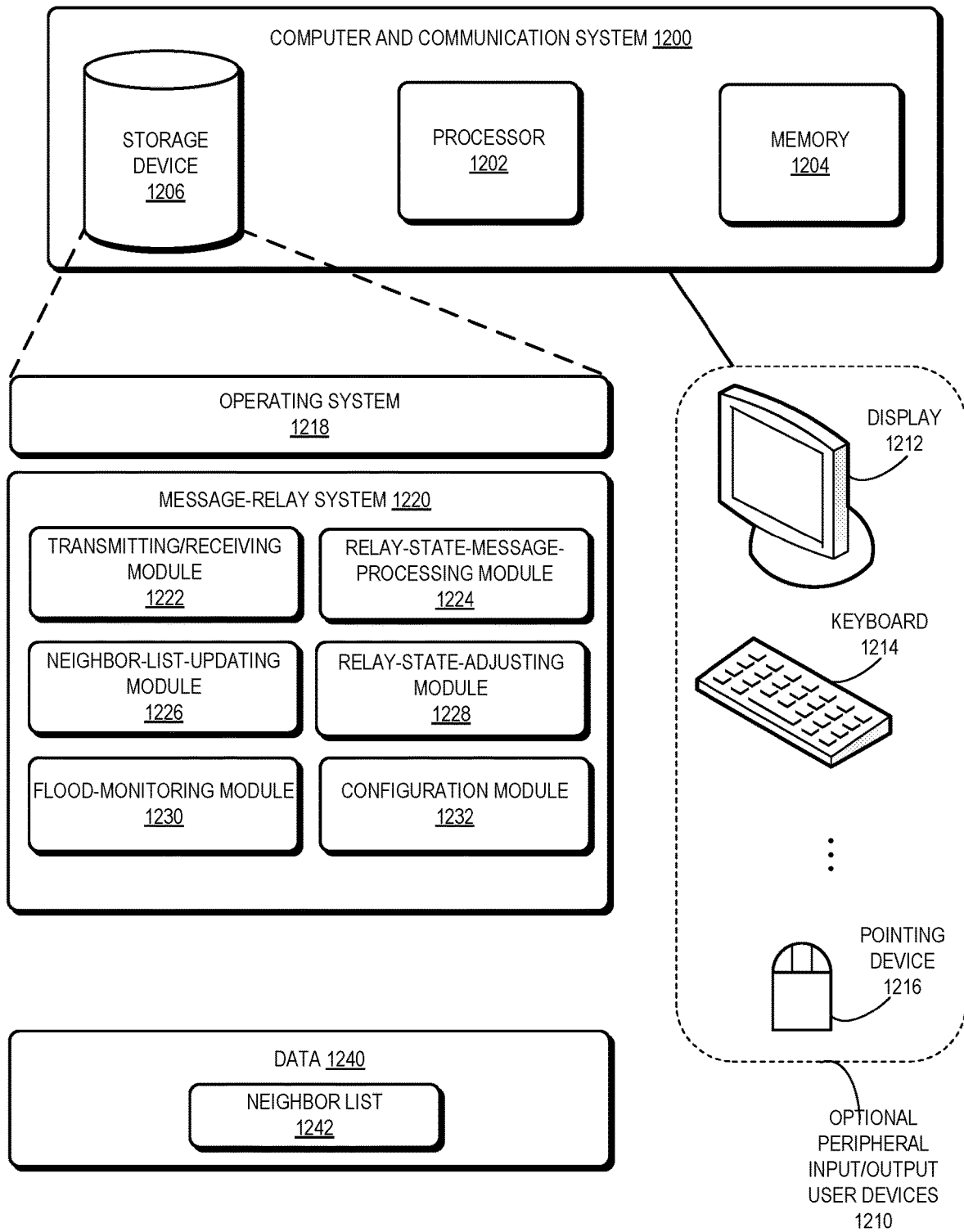
FIG. 12 illustrates an exemplary computer and communication system that facilitates relaying messages in a wireless network, according to one embodiment.

FIG. 12 illustrates an exemplary computer and communication system that facilitates relaying messages in a wireless network, according to one embodiment. Computer system 1200 includes a processor 1202, a memory 1204, and a storage device 1206. Optionally, computer system 1200 can be coupled to peripheral input/output (I/O) user devices 1210, e.g., a display device 1212, a keyboard 1214, and a pointing device 1216. Storage device 1206 can store an operating system 1218, a message-relay system 1220, and data 1240. Computer system 1200 can be a node in a wireless network comprising a plurality of nodes.

Message-relay system 1220 can include instructions, which when executed by computer system 1200, can cause computer system 1200 or processor 1202 to perform methods and/or processes described in this disclosure. Specifically, message-relay system 1220 can include instructions for transmitting and receiving messages (transmitting/receiving module 1222), instructions for processing received relay-state messages (relay-state-message-processing module 1224), instructions for updating a neighbor list (neighbor-list-updating module 1226), instructions for adjusting the relay state (relay-state-adjusting module 1228), instructions for monitoring flooding events in the network (flood-monitoring module 1230), and instructions for configuring the relay function (configuration module 1232). Data 1240 can include a neighbor list 1242.

In general, the disclosed embodiments provide a system and method for dynamically adjusting the relay state of controllable relay nodes (CRNs) in a wireless network. More specifically, each CRN in the network can periodically send relay-state messages to its neighbors and receive relay-state messages from its neighbors. Based on the received relay-state messages, each CRN can maintain a local neighbor list storing information associated with its relay neighbors. Based on information in the neighbor list, the CRN can determine whether its relay function is redundant, and if so, the CRN can turn off its relay function. This way, at any given time, the network has a minimum but sufficient number of active CRNs, thus reducing the number of unnecessary relay messages/packets in the network without negatively affecting connectivity. Because the neighbor list can be updated based on changes in the network (including topology changes or relay-state changes), the CRNs can dynamically adjust their relay state according to changes in the network. Moreover, the proposed system has a built-in fault tolerance mechanism such that, when a CRN is no longer available (e.g., due to device failure), one or more different CRNs can be quickly activated to replace the relay function provided by the failure node, thus ensuring continuous connectivity and stability of the network.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A computer-implemented method, comprising:
    obtaining relay-state information associated with a plurality of neighboring nodes of a respective node in a wireless network, which comprises receiving a relay-state message from a respective neighboring node, and wherein the relay-state message comprises address information, a relay-state indicator, and neighbor information associated with the respective neighboring node;
    identifying, among the plurality of neighboring nodes, a set of relay neighbors capable of relaying messages based on the obtained relay-state information;
    determining a connectivity status of the set of relay neighbors;
    determining an expected relay state of the respective node based on a count and the connectivity status of the set of relay neighbors; and
    adjusting a relay state of the respective node based on the expected relay state.

2. The method of claim 1, further comprising:
    in response to determining that the respective neighboring node is a relay neighbor based on the relay-state information, storing an entry corresponding to the respective neighboring node in a neighbor list maintained by the respective node; and
    updating the entry in response to receiving a subsequent relay-state message from the respective neighboring node.

3. The method of claim 2, wherein the entry comprises a timestamp associated with the relay-state message, and wherein the method further comprises:
    in response to determining, based on the timestamp, that an entry in the neighbor list expires, deleting the expired entry; and
    in response to determining, based on the timestamp, that an entry in the neighbor list needs to be updated, sending a state-request message to a corresponding neighboring node.

4. The method of claim 2, wherein updating the entry comprises deleting the entry from the neighbor list in response to determining, based on the relay-state indicator included in the subsequent relay-state message, that the relay state of the respective neighboring node is "off".

5. The method of claim 1, wherein determining the expected relay state comprises:
    determining that the expected relay state is "on," in response to determining that the count of the set of relay neighbors equals or exceeds a predetermined neighbor threshold and that the set of relay neighbors are all relay neighbors of each other.

6. The method of claim 5, further comprising:
    in response to detecting a flooding event in the wireless network, decrementing the neighbor threshold.

7. The method of claim 1, further comprising:
    periodically sending relay-state messages; and
    adjusting a period for sending the relay-state messages based on a number of previously sent relay-state messages.

8. The method of claim 1,
    wherein determining the expected relay state comprises periodically executing a relay-decision operation, and
    wherein a period for executing the relay-decision operation is adjusted based on a number of previously executed relay-decision operations.

9. The method of claim 1, wherein adjusting the relay state comprises sending a relay-configuration message from a centralized controller to the respective node to instruct the respective node to adjust the relay state.

10. A computer system, comprising:
    a processor; and
    a storage device coupled to the processor and storing instructions, which when executed by the processor cause the processor to perform a method, the method comprising:
        obtaining relay-state information associated with a plurality of neighboring nodes of a respective node in a wireless network, which comprises receiving a relay-state message from a respective neighboring node, and wherein the relay-state message comprises address information, a relay-state indicator, and neighbor information associated with the respective neighboring node;

identifying, among the plurality of neighboring nodes, a set of relay neighbors capable of relaying messages based on the obtained relay-state information;

determining a connectivity status of the set of relay neighbors;

determining an expected relay state of the respective node based on a count and the connectivity status of the set of relay neighbors; and adjusting a relay state of the respective node based on the expected relay state.

11. The computer system of claim 10, wherein the method further comprises:

in response to determining that the respective neighboring node is a relay neighbor based on the relay-state information, storing an entry corresponding to the respective neighboring node in a neighbor list associated with the respective node; and updating the entry in response to receiving a subsequent relay-state message from the respective neighboring node.

12. The computer system of claim 11, wherein the entry comprises a timestamp associated with the relay-state message, and wherein the method further comprises:

in response to determining, based on the timestamp, that an entry in the neighbor list expires, deleting the expired entry; and in response to determining, based on the timestamp, that an entry in the neighbor list needs to be updated, sending a state-request message to a corresponding neighboring node.

13. The computer system of claim 11, wherein updating the entry comprises deleting the entry from the neighbor list in response to determining, based on the relay-state indicator included in the subsequent relay-state message, that the relay state of the respective neighboring node is "off".

14. The computer system of claim 10, wherein determining the expected relay state comprises:

determining that the expected relay state is "on," in response to determining that the count of the set of relay neighbors equals or exceeds a predetermined neighbor threshold and that the set of relay neighbors are all relay neighbors of each other.

15. The computer system of claim 14, wherein the method further comprises:

in response to detecting a flooding event in the wireless network, decrementing the neighbor threshold.

16. The computer system of claim 10, wherein the method further comprises:

periodically sending relay-state messages; and adjusting a period for sending the relay-state messages based on a number of previously sent relay-state messages.

17. The computer system of claim 10, wherein determining the expected relay state comprises periodically executing a relay-decision operation, and wherein a period for executing a relay-decision operation is adjusted based on a number of previously executed relay-decision operations.

18. The computer system of claim 10, wherein adjusting the relay state comprises sending a relay-configuration message from a centralized controller to the respective node to instruct the respective node to adjust the relay state.

* * * * *